(12) United States Patent
Takamune et al.

(10) Patent No.: US 6,700,231 B2
(45) Date of Patent: Mar. 2, 2004

(54) THRUST CONVERTER, METHOD OF CONTROLLING THE SAME, AND CONTROLLER FOR CONTROLLING THE SAME

(75) Inventors: Kouichi Takamune, Tokyo (JP); Seiichi Mimura, Tokyo (JP); Hidenobu Ito, Tokyo (JP); Yoshiyuki Hatsutori, Tokyo (JP); Yoshio Kasuga, Tokyo (JP); Takao Mizutani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 39 days.

(21) Appl. No.: 09/936,332
(22) PCT Filed: Dec. 27, 2000
(86) PCT No.: PCT/JP00/09321
§ 371 (c)(1), (2), (4) Date: Dec. 31, 2001
(87) PCT Pub. No.: WO01/51239
PCT Pub. Date: Jul. 19, 2001

(65) Prior Publication Data
US 2002/0158520 A1 Oct. 31, 2002

(30) Foreign Application Priority Data
Jan. 12, 2000 (JP) ..................................... P2000-003653

(51) Int. Cl.$^7$ ................................................. H02K 7/06
(52) U.S. Cl. ............................... 310/20; 74/25; 74/110
(58) Field of Search .................. 310/20, 80; 74/25, 74/110

(56) References Cited

U.S. PATENT DOCUMENTS 4,842,476 A * 6/1989 Shiotani .................. 414/751.1

FOREIGN PATENT DOCUMENTS

| JP | 62-34708 |   | 2/1987 | ........... B23B/31/02 |
| JP | 62-43708 A | * | 2/1987 | |
| JP | 2-9521 A | * | 1/1990 | |
| JP | 2-9521 |   | 1/1990 | ........... B23B/31/24 |
| JP | 6-26511 |   | 2/1994 | ........... F16B/37/00 |
| JP | 10-138021 |   | 5/1998 | ........... B23B/31/20 |

* cited by examiner

Primary Examiner—Karl Tamai
Assistant Examiner—Judson H. Jones
(74) Attorney, Agent, or Firm—Sughrue Mion, PLLC

(57) ABSTRACT

A thrust converter includes reciprocation movement means 1; reciprocation-rotation conversion means 2 for converting reciprocating movement of the reciprocation movement means into rotational movement; rotation-reciprocation conversion means 7 for converting rotational movement of the reciprocation-rotation conversion means; and reaction-force receiving means 11 for supporting reaction force stemming from reciprocation movement of the rotation-reciprocation conversion means. Thrust imparted to the reciprocation movement means can be imparted to a load while being amplified or reduced, through employment of a compact and simple construction.

16 Claims, 14 Drawing Sheets

THRUST CONVERTER, METHOD OF CONTROLLING THE SAME, AND CONTROLLER FOR CONTROLLING THE SAME

TECHNICAL FIELD

The present invention relates to a thrust converter for driving a press-working machine or a chucking apparatus for holding a workpiece through use of a lathe, to a method of controlling the thrust converter, and to a controller for controlling the thrust converter.

BACKGROUND ART

A press-working machine or a drive machine having a chucking mechanism for holding a workpiece through use of a machine tool or the like often employs thrust induced by a hydraulic cylinder or a pneumatic cylinder.

FIG. 13 is a fragmentary longitudinal cross-sectional view showing one example of a related-art press-working machine using a hydraulic cylinder as a drive source. A hydraulic cylinder 51 is secured on a stand 52 byway of a cylinder bracket 50 and is connected to a hydraulic system 53 via a pipe 54. A push-pull rod 56 is fixed to a load-side extremity of a piston 55 of the hydraulic cylinder 51. A press punch 57 matching a geometry to be machined is attached to the extremity of the push-pull rod 56. A work table 58 is situated in a lower position within the stand 52, and a workpiece 59 is fixedly placed on the work table 58. The push-pull rod 56 is guided by the cylinder bracket 50 by way of a slide guide 60 so as to be slidable in the axial direction.

In such a related-art press-working machine, the piston 55 of the hydraulic cylinder 51 is reciprocated by means of oil supplied from the hydraulic system 53 by way of the pipe 54. By means of thrusting action of the push-pull rod 56 fixed to the piston 55, the press punch 57 is pushed, to thereby press, into a desired geometry, the workpiece 59 fixedly placed on the work table 58.

FIG. 14 is a fragmentary transverse cross-sectional view showing one example of related-art chucking apparatus using a hydraulic cylinder as a chuck drive source. A rotary hydraulic cylinder 64 is supported by a cylinder cover 66 via shaft bearings 65a and 65b. A rear extremity of a main spindle 70 is secured on a load-side extremity of the rotary hydraulic cylinder 64 via an adapter 72a.

A chuck 71 is secured on the front extremity of the main spindle 70 via an adapter 72b. A draw bar 73 is inserted into an internal hollow spindle core of the main spindle 70, and the extremity of the draw bar 73 is engaged with chuck claws 74 via an operation conversion mechanism 75. The operation conversion mechanism 75 converts axial operation of the draw bar 73 into radial operation of the chuck claws 74 by means of a cam lever or a taper.

The rear extremity of the draw bar 73 is secured to the load-side extremity of a piston 55 of the rotary hydraulic cylinder 64.

In the related-art chuck drive system using a hydraulic cylinder as a chuck drive source, oil is supplied to the rotary hydraulic cylinder 64 from a hydraulic system 53 via a pipe 54, thereby reciprocating the piston 55. The axial operation of the draw bar 73 is converted into a radial operation of the chuck claws 74, thereby causing the chuck 71 to hold a workpiece 67.

After the chuck claws 74 have held the workpiece 67, a main spindle motor 76 is rotated, thereby cutting the workpiece 67 and causing rotation of the main spindle 70, the draw bar 73, the chuck 71, the operation conversion mechanism 75, the rotary hydraulic cylinder 64, the piston 55, the workpiece 67, and the adapters 72a and 72b, thereby machining the workpiece 67.

In the related-art examples, a hydraulic cylinder is used for a press-working machine or a chucking apparatus. The same also applies to a case where a pneumatic cylinder is employed.

Another related-art example is a chucking apparatus using an electric motor as a chuck drive source described in Japanese Patent Application Laid-Open No. 34708/1987.

The chucking apparatus described in Japanese Patent Application Laid-Open No. 34708/1987 employs an electric motor as a chuck drive source. Drive force of the electric motor is amplified by a decelerator, and the thus-amplified drive force is transmitted to the chucking apparatus main unit. The chuck is closed by means of the thus-amplified drive force, thereby holding a workpiece.

At the time of machining operation, the workpiece is machined while a draw bar drive system is separated from a rotary system of the main spindle by means of an electromagnetic clutch.

In a press-working system or a chucking apparatus employing a related-art hydraulic cylinder or pneumatic cylinder, thrust is determined by the pressure which a hydraulic or pneumatic system can produce as well as by the diameter of the cylinder. When greater thrust is required, the pressure and/or the diameter must be changed correspondingly, thereby adding to costs.

Some decelerators employ gears as a torque amplification (or torque reduction) mechanism. Such a decelerator usually amplifies (or reduces) a rotational input and outputs as a rotational output. In order to amplify (or reduce) an axial input (or thrust) and output an axial output (thrust), mechanical components such as various gears must be combined together, thereby rendering the chucking apparatus bulky. Reactive force is exerted on a bearing which supports gears in a rotatable manner, thereby shortening the life of the decelerator. For this reason, a desire exists for a low-cost, compact, long-life thrust converter of simple construction which can amplify (reduce) an axial input (thrust) and output the thus-amplified axial input as an axial output (thrust).

Employment of a decelerator adopting a gear mechanism for amplifying the rotation torque of a motor, as in, for example, a chucking apparatus described in Japanese Patent Application Laid-Open No. 34708/1987, requires an electromagnetic clutch for separating a draw bar drive system from a main spindle rotation system during machining of a workpiece. Thus, the chucking apparatus presents a problem of an increase in the number of components, thereby adding to costs.

In the electromagnetic chucking apparatus, a workpiece is held by imparting axial thrust to a draw bar. During machining of a workpiece, a bearing which rotatably supports the draw bar receives all reaction force of axial thrust. Hence, an increase in the rotational speed of the main spindle or an increase in holding force due to an increase in axial thrust of a draw bar poses problems of drastically shortening the life of a bearing.

DISCLOSURE OF THE INVENTION

The present invention provides a thrust converter comprising:

reciprocating movement means;

reciprocation-rotation conversion means for converting reciprocating movement of the reciprocation movement means into rotational movement;

rotation-reciprocation conversion means for converting rotational movement of the reciprocation-rotation conversion means into reciprocating movement; and reaction-force receiving means for supporting reaction force of reciprocating movement of the rotation-reciprocation conversion means.

Hence, thrust imparted to the reciprocation movement means can be imparted to a load while being amplified or reduced, through employment of a compact and simple construction. So long as the thrust converter is applied to a press-working machine or a chuck drive machine, thereby providing a useful novel thrust converter.

Preferably, the reciprocation movement means, the reciprocation-rotation conversion means, the rotation-reciprocation conversion means, and the reaction-force receiving means are aligned in one line, and a through hole is formed so as to pass through the center axes thereof.

Hence, there can be provided a thrust converter which can be applied to a lathe chuck for machining long materials.

Preferably, the reciprocation-rotation converter means comprises a first screw member to which axial thrust is imparted by the reciprocation movement means, a second screw member to be screw-engaged with the first screw member, and a first detent section for locking the first screw member so as to restrict movement to only an axial direction; the rotation-reciprocation conversion means comprises a screw section provided on the second screw member in a position different from the location of a screw section to be screw-engaged with the first screw member, a third screw member to be screw-engaged with the screw section, and a second detent section for locking the third screw member so as to restrict movement to only an axial direction; and the reaction-force receiving means comprises a substrate, the second screw member, and a first shaft bearing for supporting the second screw member on the substrate so as to allow rotation and to prohibit axial movement.

The majority of the constituent elements can be formed from screw members, and hence there can be provided a low-cost thrust converter having superior productivity.

Preferably, the first screw member is supported by the reciprocation movement means by way of a second shaft bearing so as to be rotatable.

Hence, the reciprocation movement means, the reciprocation-rotation conversion means, the rotation-reciprocation conversion means, and reaction-force receiving means can be separated from each other in a rotating direction with use of simple components. There can be provided a thrust converter applicable to a lathe chucking apparatus whose load rotates at high speed.

Preferably, the reciprocation movement means comprises a motor, and motor rotation-reciprocation conversion means for converting rotating movement of a shaft of the motor into reciprocating movement.

There can be provided a thrust converter which has a good maintenance characteristic and which enables easy non-stage control of thrust to be output to a load with a simple construction.

Preferably, the reciprocation movement means comprises a motor, a fourth screw member provided on a load-side extremity of a shaft of the motor, a fifth screw member to be screw-engaged with the fourth screw member, a third detent section for locking the fifth screw member so as to restrict movement to only an axial direction, and motor rotation-reciprocation conversion means for converting the rotating movement of the shaft of the motor into reciprocating movement; the reciprocation-rotation conversion means comprises a first screw member supported by the fifth screw member so as to allow rotation and to prohibit axial movement by way of a second shaft bearing, a second screw member to be screw-engaged with the first screw member, and a first detent section for locking the first screw member so as to restrict movement to only the axial direction; the rotation-reciprocation conversion means comprises a screw section provided on the second screw member in a position different from the location of a screw section to be screw-engaged with the first screw member, a third screw member to be screw-engaged with the screw section, and a second detent section for locking the third screw member so as to restrict movement to only an axial direction; and the reaction-force receiving means comprises a substrate, the second screw member, and a first shaft bearing for supporting the second screw member on the substrate so as to allow rotation and to prohibit axial movement.

The majority of the constituent elements can be formed from screw members, and hence there can be provided a low-cost thrust converter having superior productivity. Further, there can be provided a thrust converter which has a good maintenance characteristic and which enables easy non-stage control of thrust to be output to a load with a simple construction.

Preferably, the second detent section for locking the third screw member so as to restrict movement to only an axial direction is interposed between the third screw member and a first screw member.

There can be provided a thrust converter having a shorter axial dimension.

Preferably, screw lead of the first screw member and screw lead of a second screw member to be screw-engaged with the first screw member are greater than screw lead of a screw section provided on the second screw member in a position different from the location of a screw section to be screw-engaged with the first screw member and greater than screw lead of a third screw member to be screw-engaged with the screw section.

There can be provided a thrust converter which can produce great thrust on a load with a simple construction and a small thrust drive source and which can make the unit of amplification minute.

Preferably, screw lead of the first screw member and screw lead of a second screw member to be screw-engaged with the first screw member are smaller than screw lead of a screw section provided on the second screw member in a position different from the location of a screw section to be screw-engaged with the first screw member and smaller than screw lead of a third screw member to be screw-engaged with the screw section.

There can be provided a thrust converter which can impart thrust to a load while reducing the load with a simple construction and a small thrust drive source and which can make the unit of amplification minute.

Preferably, provided that a screw lead angle between a screw section which is formed on the second screw member in a location different from that of a screw section to be screw-engaged with the first screw member and a third screw member to be screw-engaged with the screw section is taken as $\beta$ and a coefficient of friction of a screw is taken as $\mu$, a screw is formed so as to assume a relationship $\tan\beta < \mu$.

Although rotational torque can be converted into thrust, thrust cannot be converted into rotational torque. Hence, loosening of the third screw member stemming from counteracting thrust imposed by a load can be prevented. After given thrust has been imparted to a load, thrust of the reciprocation movement means can be interrupted, thereby realizing energy saving. Since the reciprocation movement means and the reciprocation-rotation conversion means are separated from each other in the rotating direction. There can be provided a thrust converter, wherein, when a second bearing is interposed between the reciprocation movement means and the reciprocation-rotation conversion means, no thrust load is imposed on the second bearing, thus lengthening the life of a shaft bearing.

Preferably, a main spindle shaft of a chucking apparatus corresponding to the substrate is secured to a mount frame fixed to a load-side bracket of a motor by way of a third bearing so as to be rotatable and to not be capable of axial movement.

There can be provided a thrust converter which can be replaced with a chucking apparatus employing related-art hydraulic or pneumatic cylinder.

Preferably, the second bearing is constituted of a double bearing.

Hence, there can be provided a thrust converter which can reduce load exerted in the direction of thrust one-half, thereby lengthening the life of a shaft bearing.

Preferably, a motor whose torque can be controlled through current control is used as the motor, and constant thrust is produced by constant control of the current to the motor.

There can be produced a thrust converter which can produce given thrust at all times.

The present invention provides a method of controlling a thrust converter, wherein a motor whose torque and positions can be controlled through current control is used as the motor; and wherein the position of the motor is controlled until the motor moves to a predetermined position, and torque of the motor is controlled. When the thrust converter is applied to a lathe chucking apparatus, there can be provided a thrust converter capable of increasing chucking operation.

Preferably, the present invention provides a method of controlling the thus converted device, wherein, on the basis of the moving state of an external driver source other than the drive source of the thrust converter, there is computed the amount of correction to be used for correcting the position or torque of a motor of the thrust converter. The position or torque of the motor of the thrust converter on the basis of the thus-computed amount of correction.

Hence, application of mechanical disturbance to the thrust converter can be obviated. Hence, there can be provided a highly-precise thrust converter. For instance, when a chucking apparatus employs the thrust converter, disturbance due to centrifugal force can be eliminated, thereby enabling generation of appropriate holding force at all times.

Preferably, the present invention provides a method of controlling the thus converted device, wherein, on the basis of the temperature of a machine having the thrust converter provided thereon, the amount of correction to be used for correcting the position of a motor of the thrust converter is computed or read from memory. The position of the motor of the thrust converter is corrected on the basis of the amount of correction.

Application of thermal disturbance to the thrust converter can be obviated without addition of a special device. Hence, there can be provided a high-precision thrust converter. For instance, if a chucking apparatus adopts the thrust converter, thermal disturbance can be eliminated, thereby enabling constant generation of appropriate holding force.

Preferably, there are provided an input section for entering a moving status of an external drive source other than a drive source of the thrust converter; computation means for computing the amount of correction used for correcting the position or torque of a motor of the thrust converter on the basis of the moving status entered by way of the input section; and correction means for correcting the position or torque of the motor of the thrust converter on the basis of the computed amount of correction.

Application of thermal disturbance to the thrust converter can be obviated without addition of a special device. Hence, there can be provided a high-precision thrust converter. For instance, if a chucking apparatus adopts the thrust converter, thermal disturbance can be eliminated, thereby enabling constant generation of appropriate holding force.

Preferably, there are provided an input section for entering the temperature of a machine having provided thereon the thrust converter;

means for computing the amount of correction required for correcting the position of a motor of the thrust converter or reading the amount of correction from memory; and correction means for correcting the position of the motor of the thrust converter in accordance with the amount of correction. Application of thermal disturbance to the thrust converter can be obviated without addition of a special device. Hence, there can be provided a high-precision thrust converter. For instance, if a chucking apparatus adopts the thrust converter, thermal disturbance can be eliminated, thereby enabling constant generation of appropriate holding force.

Preferably, there are provided a manual instruction device for inputting a positional instruction to a motor whose torque and position can be controlled;

control means for controlling the position and torque of the motor; and changeover means for which operates the motor through position control on the basis of a difference when a difference between the positional instruction and the current position is lower than a predetermined value and changes the motor to torque control when the difference between the positional instruction and the current position exceeds the predetermined value.

After the thrust converter has been constrained mechanically, thrust adjustment can be effected readily manually. When the thrust converter is applied to a lathe chucking apparatus, the status of the chucking apparatus shifts from position control to torque control by means of an operator entering only a position instruction. The operator can be effect an appropriate chuck opening/closing operation without consideration of statuses of the chuck opening and closing states.

Preferably, the changeover means comprises: current limit means for limiting a current instruction to be sent to the motor; and means which sets a limit current value of the current limit means so as to become greater than a current instruction value based on a difference when a difference between the positional instruction and the current position is lower than a predetermined value and which sets the limit current value of the current limit means so as to become smaller than the current instruction value based on a difference when a difference between the positional instruction and the current position exceeds the predetermined value.

After the thrust converter has been constrained mechanically, thrust adjustment can be effected readily manually. Adjustment of thrust can be effected without changing the gain of a feedback loop, thereby preventing occurrence of unstable control operation. When the thrust converter is applied to a lathe chucking apparatus, the status of the chucking apparatus shifts from position control to torque control by means of an operator entering only a position instruction. The operator can be effect an appropriate chuck opening/closing operation without consideration of statuses of the chuck opening and closing states.

Preferably, there are provided an input section for entering a correction value to be used for correcting a mechanical positional error of the thrust converter;

storage means for storing the correction value entered by way of the input means; and correction means for correcting the mechanical positional error of the thrust converter on the basis of the correction value stored in the storage means.

As a result, the positional accuracy of the thrust converter can be improved without being affected by the accuracy of a rotary sensor mounted on a motor or by the accuracy of the mechanism of the thrust converter. Hence, there can be provided a high-precision thrust converter through use of low-cost components and while saving costs.

BEST MODES FOR CARRYING OUT THE INVENTION

First Embodiment

Figure 1:
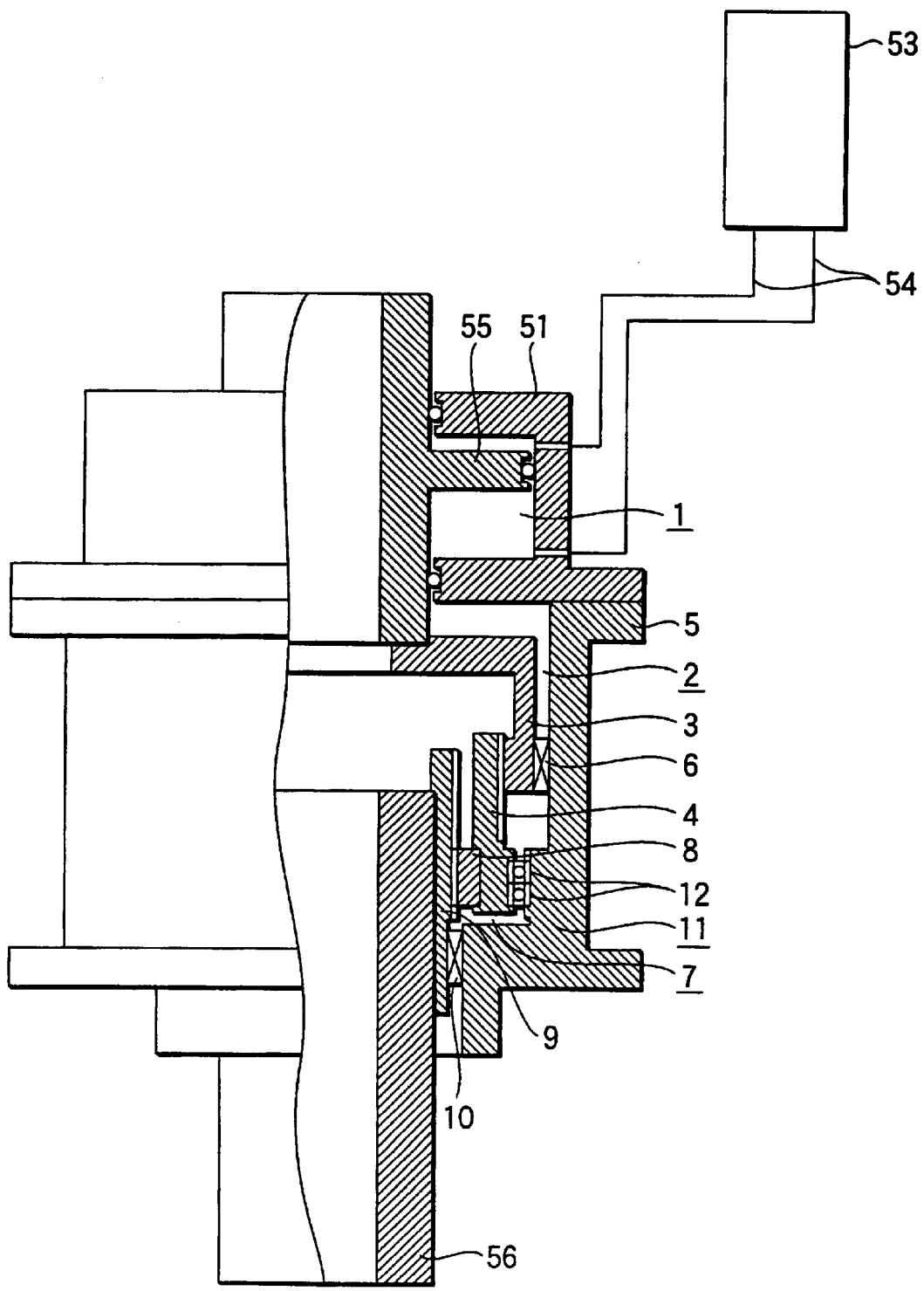
FIG. 1 is a fragmentary longitudinal cross-sectional view showing the construction of a thrust converter according to a first embodiment of the present invention.

FIG. 1 is a fragmentary longitudinal cross-sectional view showing a first embodiment of a thrust converter according to the present invention.

In FIG. 1, reference numeral 1 designates a reciprocation section serving as reciprocation means. The reciprocation section 1 is constituted of a hydraulic cylinder 51, a piston 55, and a pipe 54 for connecting a hydraulic system 53 to the hydraulic cylinder 51. An O-ring is interposed between the hydraulic cylinder 51 and the piston 55 for preventing leakage of oil.

Reference numeral 2 designates a rotation-reciprocation conversion section serving as reciprocating rotation conversion means. The reciprocating rotation conversion means 2 comprises a first nut 3 which is fixed directly on a load-side extremity of the piston 55 and corresponds to a first screw member; a first screw shaft 4 which is to be screw-engaged with the first nut 3 and corresponds to a second screw member; an outer frame 5; and a first linear guide 6 for stopping the first nut 3 so as restrict movement to only the axial direction relative to the outer frame 5.

Reference numeral 7 designates a rotation-reciprocation conversion section serving as rotation reciprocating conversion means. The rotation-reciprocation conversion section 7 comprises a second nut 8 which is fixed on the inside of the first screw shaft 4 and which corresponds to a screw section provided on the second screw member (i.e., the first screw shaft 4) in a position different from the location of a screw section to be screw-engaged with a first screw member (a first nut 3); a second screw shaft 9 which is to be screw-engaged with the second nut 8 and which corresponds to a third screw member; the outer frame 5 corresponding to a substrate; and a second linear guide 10 which stops rotation of the second screw shaft 9 so as to restrict movement to only the axial direction relative to the outer frame 5. A push-pull rod 56 is secured on the extremity of the second screw shaft 9.

Reference numeral 11 designates a reaction-force receiving section serving as reaction-force receiving means. The reaction force receiving section 11 is constituted of the outer frame 5 serving as a substrate; the first screw shaft 4; and a first shaft bearing 12 which supports the first screw shaft 4 on the outer frame 5 so as to allow movement in only the axial direction.

The reciprocating movement section 1, the rotation-reciprocation conversion section 2, the rotation-reciprocation conversion section 7, and the reaction force receiving section 11 are aligned in one line, and a through hole is formed so as to pass through the center axes of thereof.

Figure 2:
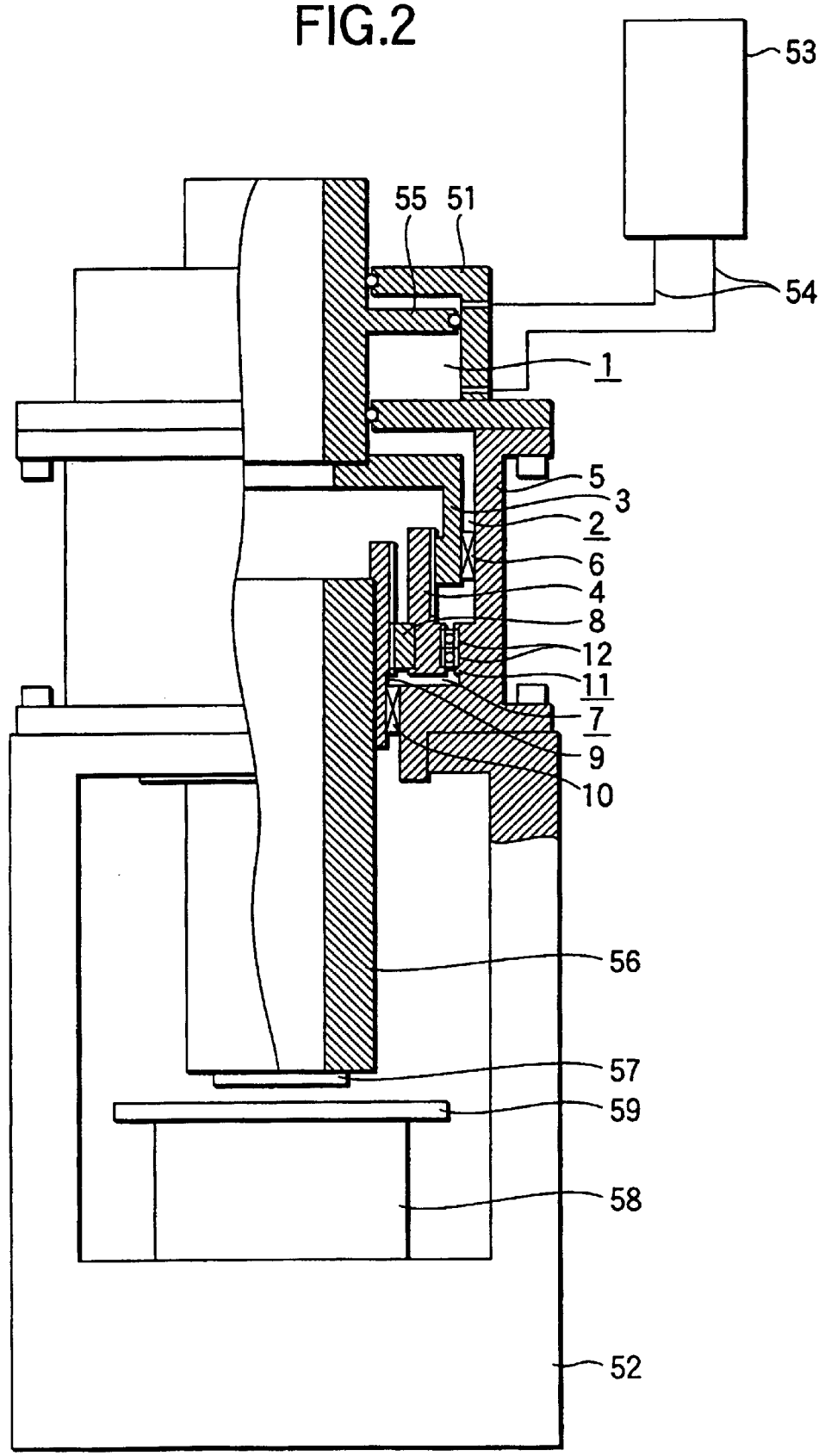
FIG. 2 is a fragmentary longitudinal cross-sectional view showing the construction of a press-working machine to which the thrust converter according to the first embodiment is applied.
Figure 13:
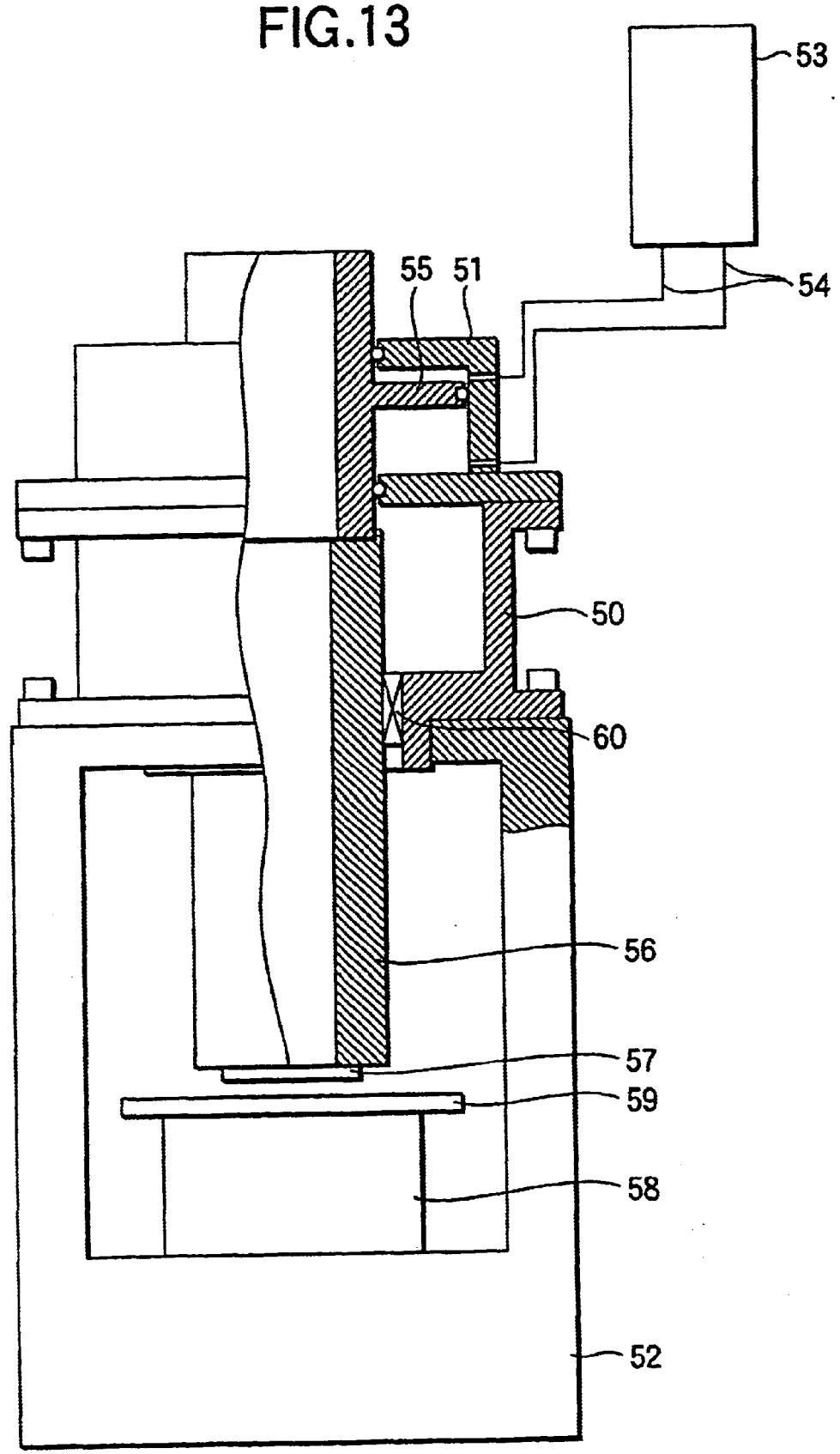
FIG. 13 is a fragmentary longitudinal cross-sectional view showing the construction of a related-art press-working machine.

FIG. 2 is a fragmentary longitudinal cross-sectional view showing a press-working machine using the thrust converter shown in FIG. 1. Reference numerals 1 through 12 designate constituent elements which are identical with or correspond to those shown in FIG. 1. Reference numerals 51 through 59 designate constituent elements which are identical with or correspond to those of the related-art press-working machine shown in FIG. 13.

The operation of the thrust converter according to the first embodiment will next be described by reference to FIGS. 1 and 2. In the thrust converter having the foregoing construction, when oil is supplied from the hydraulic system 53 to the hydraulic cylinder 51 by way of the pipe 54, the piston 55 of the hydraulic cylinder 51 moves axially by means of the thrust corresponding to the pressure produced by the hydraulic system 53 and the diameter of the hydraulic cylinder 51. The thrust presses the first nut 3 axially.

When the first nut 3 is pressed axially, the first screw shaft 4 to be screw-engaged with the first nut 3 is rotated, because the first nut 3 is stopped by means of the first linear guide 6 so as to be movable in only the axial direction. As a result, thrust stemming from axial movement of the first nut 3 is converted into rotational torque due to rotational movement of the first screw shaft 4.

Here, provided that thrust stemming from axial movement of the first nut 3 is taken as F1, rotational torque of the first screw shaft 4 is taken as T1, a screw lead is taken as L1, and a reciprocating rotation conversion efficiency is taken as η1, the following relationship stands:

$$T1=(L1 \cdot F1 \cdot \eta 1)/2\pi \qquad \text{(Eq. 1)}.$$

When the first screw shaft 4 rotates, the second nut 8 fixed on the inside of the first screw shaft 4 also rotates. Since the second screw shaft 9 is stopped by means of the second linear guide 10 so as to be movable in only the axial direction, the second shaft 9 to be screw-engaged with the second nut 8 moves axially. As a result, the rotational movement torque of the second nut 8 is converted into thrust stemming from the axial movement of the second screw shaft 9.

Provided that rotational torque stemming from rotational movement of the first screw shaft 4 and from that of the second nut 8 is taken as T1, thrust stemming from axial movement of the second screw shaft 9 is taken as F2, the screw lead of the second screw shaft 9 is taken as L2, and the rotation reciprocating conversion efficiency is taken as η2, the following relationship stands:

$$F2=(2\pi \cdot T1 \cdot \eta 2)/L2 \qquad \text{(Eq. 2)}.$$

In FIG. 2, the thrust stemming from axial movement of the second screw shaft 9 acts as thrust for the push-pull rod 56 fixed to the second screw shaft 9. The press punch 57 is pressed against a predetermined position on the workpiece 59 fixedly provided on the work table 58.

The reaction force imposed on the press punch 57 during a pressing operation is received by the first bearing 12 and the outer frame 5, the bearing 12 supporting the first screw shaft 4 on the outer frame 5 so as to allow rotation and axial movement, by way of the push-pull rod 56, the second screw shaft 9, the second nut 8, and the first screw shaft 4. No axial reaction force is exerted on the first nut 3 and the piston 55.

Here, assuming that thrust due to axial movement imparted to the first nut 3 from the piston 55 of the hydraulic cylinder 51 is taken as F1 and that axial thrust developing in the second screw shaft 9 is taken as F2, the following relationship is induced by Eqs. 1 and 2.

$$F2/F1=(L1/L2)\eta c$$

ηc: Movement conversion efficiency of a screw
L1: screw lead of the first screw shaft 4
L2: screw lead of the second screw shaft 9.

In a case where the thrust converter is constituted of screw leads of L1>L2, thrust F2 developing in the second screw shaft 9 is converted and amplified into thrust which is (L1/L2)·η times thrust F1. Hence, even when the hydraulic system 53 produces small thrust, great axial movement thrust can be imparted to the push-pull rod 56.

By way of an example, the thrust converter is constituted of screw leads L1=20 (mm) and L2=5 (mm) and has ηc=80 (%), and thrust F1 of 100 (N) is imparted. In this case, thrust F2 is amplified to 320 (N).

Conversely, in a case where the thrust converter is constituted of screw leads of L1<L2, thrust F2 developing in the second screw shaft 9 is converted into and reduced to thrust which is (L1/L2)·η times thrust F1. Hence, even when the hydraulic system 53 produces great thrust, small thrust can be imparted to the push-pull rod 56, thereby enabling fine thrust control.

The above-described embodiment has shown an example in which a hydraulic cylinder is applied to the reciprocating movement section 1. However, a linear motor or a pneumatic cylinder may also be applied to the reciprocating movement section 1.

Second Embodiment

A second embodiment of the present invention is described by reference to FIG. 3 (a fragmentary transverse cross-sectional view of a lathe chucking apparatus to which a thrust converter is applied).

The second embodiment relates to a thrust converter to which a servo motor is applied, the motor having a rotor in a reciprocating movement section 1.

Figure 3:
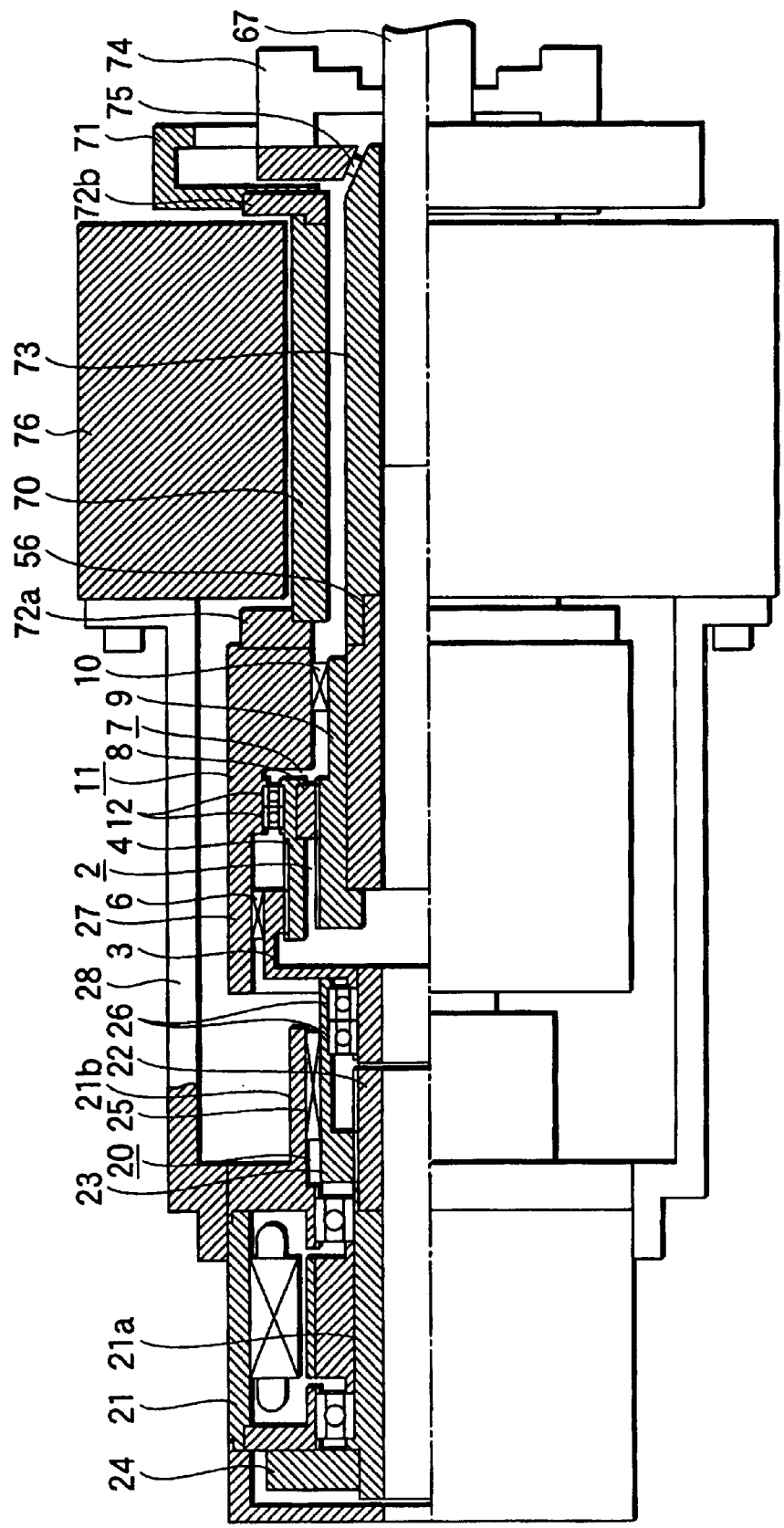
FIG. 3 is a fragmentary longitudinal cross-sectional view showing the construction of a chucking apparatus to which a thrust converter according to a second embodiment of the present invention is applied.

As shown in FIG. 3, reference numeral 20 designates a motor rotation-reciprocation conversion section serving as motor rotation-reciprocation conversion means. The motor rotation-reciprocation conversion section comprises a servo motor 21 capable of effecting position and torque control operations; a third screw shaft 22 which is fixed to a load-side extremity of a motor shaft 21a of the servo motor 21 and corresponds to a fourth screw member; a third nut 23 which is to be screw-engaged with the third screw shaft 22 and corresponds to a fifth screw member; and a third linear guide 25 which locks the third nut 23 against the motor-load-side extremity bracket 21b of the servo motor 21 so as to restrict movement to only the axial direction. A motor rotary position detection section 24 serving as means for detecting the rotary position of the motor is provided on the opposite extremity of the motor shaft 21a.

Reference numeral 2 designates a reciprocation-rotation conversion section serving as reciprocation-rotation conversion means. The reciprocation-rotation conversion section 2 is constructed so as to be rotatable relative to the third nut 23 and able to move axially in conjunction with the third nut 23 and comprises a first nut 3. The first nut 3 corresponds to a first screw member and supports a non-thread section of the third nut 23 extending toward the motor via a second shaft 26. On a non-thread section of the third nut 23 extending in the direction away from the motor, there are provided the first nut 3; a first screw shaft 4 corresponding to a second screw member; a main rotary shaft 27; and a first linear guide 6 which locks the first nut 3 against the main rotary shaft 27 so as to restrict movement to only the axial direction.

Reference numeral 7 designates a rotation-reciprocation conversion section serving as rotation reciprocating conversion means. The rotation-reciprocation conversion section 7 comprises a second nut 8 which is fixed on the inside of the first screw shaft 4 and corresponds to a screw section provided on the first screw shaft 4 (i.e., the second screw member) in a position different from the location of a screw section to be screw-engaged with the first nut 3 (i.e., the first screw member); a second screw shaft 9 which is to be screw-engaged with the second nut 8 and corresponds to a third screw member; the main rotary shaft 27; and the second linear guide 10, which locks the second screw shaft 9 against the main rotary shaft 27 so as to restrict movement to only the axial direction. A push-pull rod 56 is secured on the extremity of the second screw shaft 9.

Provided that a screw lead angle between the second nut 8 and the second screw shaft 9 to be screw-engaged with the second nut 8 is taken as β and that a coefficient of friction of a screw is taken as μ, a screw thread is formed so as to assume a relationship tan β<μ.

Reference numeral 11 designates a reaction-force receiving section serving as reaction-force receiving means. The reaction force receiving section 11 is constituted of the main rotary shaft 27 serving as a base; the first screw shaft 4; and the first shaft bearing 12, which supports the first screw shaft 4 on the main rotary shaft 27 in a rotatable manner so as to prohibit axial movement.

The motor rotation-reciprocation conversion section 20, the reciprocation-rotation conversion section 2; the rotation-reciprocation conversion section 7; and the reaction force receiving section 11 are aligned in one line, and a through hole is formed so as to pass through the center axes thereof.

A rear extremity of the main rotary shaft 27 is secured on the load-side extremity of the main spindle 70 via the adapter 72a. The chuck 71 have held the workpieces 67 is secured on the front extremity of the main spindle 70 via the adapter 72b. The draw bar 73 is inserted into an internal hollow spindle core of the main spindle 70 so as to be movable in the axial direction, and the extremity of the draw bar 73 is engaged with chuck claws 74 via the operation conversion mechanism 75. The operation conversion mechanism 75 converts axial operation of the draw bar 73 into radial operation of the chuck claws 74 by means of a cam lever or a taper. The rear extremity of the draw bar 73 is secured to the front extremity of the push-pull bar 56.

The motor 21 is fixed to a main spindle motor section 76 via a mount frame 28, thereby indirectly supporting the rotation-reciprocation conversion section 20, the reciprocation-rotation conversion section 2, the rotation-reciprocation conversion section 7, the reaction-force receiving section 11, and the second shaft bearing 26.

Next, the operation of the lathe chucking apparatus according to the second embodiment will be described by reference to FIG. 3.

In the chucking apparatus having the foregoing construction, when the motor 21a rotates at given rotation torque, the third screw shaft 22 secured on the load-side extremity of the motor shaft 21a rotates in an analogous fashion. The third nut 23 to be screw-engaged with the third screw shaft 22 is locked by the third linear guide 25 so as to be movable in only the axial direction. Hence, the third nut 23 moves axially. As a result, rotational movement torque developing between the motor shaft 21a and the third screw shaft 22 is converted into axial movement thrust of the third nut 23.

When the third nut 23 has moved axially, the first nut 3 that has supported the second shaft bearing 26 in a rotatable manner so as to prohibit axial movement is moved axially by means of axial thrust of the third nut 23.

Provided that rotational torque of rotational movement of the motor shaft 21a and that of the third screw shaft 22 are taken as TM, axial thrust of the third nut 23 is taken as F, screw lead of the third screw shaft 22 is taken as L, and a rotation-reciprocation conversion efficiency is taken as ηc, the following relationship is obtained:

$$F = (2\pi \cdot TM \cdot \eta c)/L \qquad \text{(Eq. 3)}.$$

The axial thrust F of the third nut 23 into which rotational torque of the motor shaft 21a has been converted yields the same advantage as that yielded by the axial thrust F1 of the first nut 3 induced by the piston 55 of the hydraulic cylinder 51 described in connection with the first embodiment.

Operations of the chucking apparatus involved in axial movement of the first nut 3 through axial movement of the push-pull rod 56 are the same as those described in connection with the first embodiment. Although detailed descriptions are omitted, axial thrust F1 in the first nut 3 is amplified in proportion to a lead ratio of screw lead L1 of the reciprocation-rotation conversion section 1 to screw lead L2 of the rotation-reciprocation conversion section 7; that is, (L1/L2). The axial thrust F2 of the push-pull rod 56 yields the same advantage as that yielded in the first embodiment.

When the push-pull rod 56 moves axially by means of thrust F2, the draw bar 73 secured on the push-pull rod 56 moves axially by means of the same thrust. Axial operation is converted into radial operation of the chuck claws 74, thereby causing the chuck 71 to hold the workpiece 67.

When the main spindle 70 is rotated by the main spindle motor section 76 after the chuck claws 74 have held the workpiece 67, the workpiece 67 is machined with involvement of rotation of the draw bar 73, the chuck 71, the operation conversion mechanism 75, the workpiece 67, the adapters 72a and 72b, the push-pull rod 56, the rotation-reciprocation conversion section 7, and the reciprocation-rotation conversion section 2.

The first nut 3 of the rotation-reciprocation conversion section 7 is supported rotatably by means of the shaft bearing 26 of the third nut 23 of the motor rotation-reciprocation conversion section 20. Even when the main spindle 70 has rotated, the motor rotation-reciprocation conversion section 20 remains stationary.

Provided that the screw lead angle between the second nut 8 and the second screw shaft 9 to be screw-engaged with the second nut 8 is taken as β and that a coefficient of friction of a screw is taken as μ, a screw thread is formed so as to assume a relationship tan β<μ. A screw satisfying the above conditional equation assumes a negative conversion efficiency when thrust is converted into rotational torque. Rotational torque can be converted into axial thrust by means of imparting the rotational torque to the screw. However, conversion of axial thrust into rotational torque is impossible.

More specifically, conversion of rotational torque into axial thrust of the second screw shaft 9 screw-engaged with the locked second nut 8 can be effected by means of rotating the second nut 8 at predetermined torque. Even when axial thrust is imparted to the second screw shaft 9, the second nut 8 cannot rotate.

Accordingly, even if reaction force of axial thrust of the draw bar 73 has been exerted on the second screw shaft 9 after axial thrust has been imparted to the draw bar 73 until predetermined gripping force (fastening force) is exerted on the workpiece 67, the second nut 8 remains fastened. Even when rotational force of the motor shaft 21a is interrupted, the gripping force of the chuck claws 74 is retained. Elimination of the need to supply electric current to the motor 21 during machining of a workpiece yields a great energy-saving effect.

Moreover, when the axial thrust reaction force which is imposed by the push-pull rod 53 on the draw bar 73 at the time of holding of the workpiece 67 is received by the first shaft bearing 12 and the main rotary shaft 27 via the push-pull rod 56, the second screw shaft 9, the second nut 8, and the first screw shaft 4. Hence, reaction force is not exerted on the first nut 3 and the shaft bearing 26.

Accordingly, increased speed and gripping force of the shaft bearing 26 and longer life of the shaft bearing 26 can be realized.

Third Embodiment

A third embodiment of the present invention will now be described by reference to FIG. 4.

Figure 4:
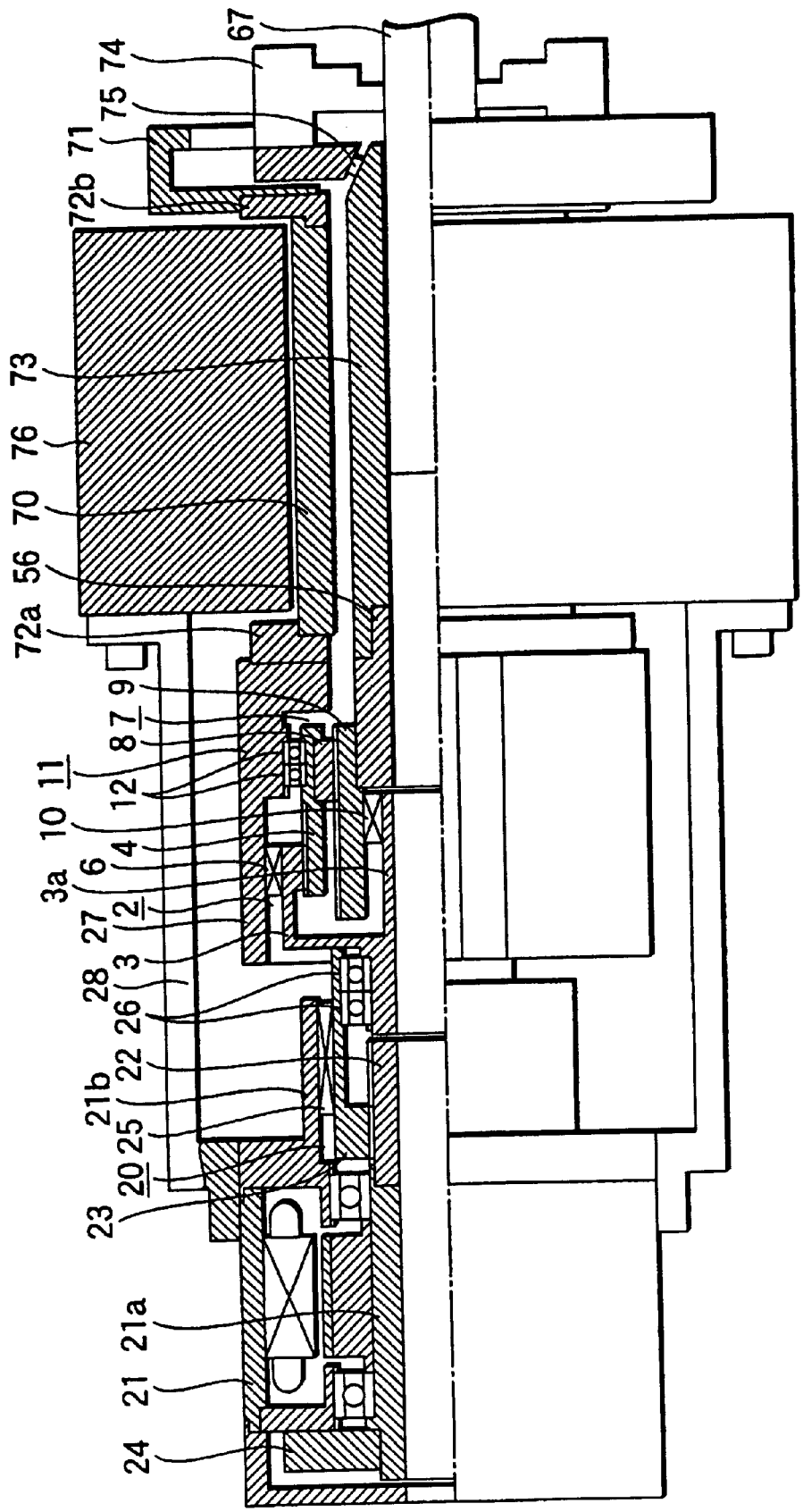
FIG. 4 is a fragmentary longitudinal cross-sectional view showing the construction of a chucking apparatus to which a thrust converter according to a third embodiment of the present invention is applied.

FIG. 4 is a fragmentary transverse cross-sectional view of a chucking apparatus to which a thrust converter is applied, and reference numerals which are the same as those shown in FIG. 3 in connection with the second embodiment designate identical or corresponding elements.

In the second embodiment, the second linear guide 10 which locks the second screw shaft 9 against the main rotary shaft 27 so as to restrict movement to only the axial direction is provided on the load-side extremity of the main rotary shaft 27. As shown in FIG. 4, in the third embodiment, the first nut 3 is constituted so as to assume a double cylindrical structure. The second linear guide 10 is interposed between the inner peripheral section of the second screw shaft 9 and the outer peripheral section of the inner ring 3a of the first nut 3. Thereby, the second screw shaft 9 is locked so as to be movable in only the axial direction with reference to the inner ring 3a of the first nut 3.

Such a construction yields the same advantage as that yielded in the second embodiment. The axial length of a load-side extremity of the main rotary shaft 27 can be shortened, and hence the overall length of the chucking apparatus can be shortened.

Fourth Embodiment

A fourth embodiment of the present invention is now described by reference to FIG. 5.

Figure 5:
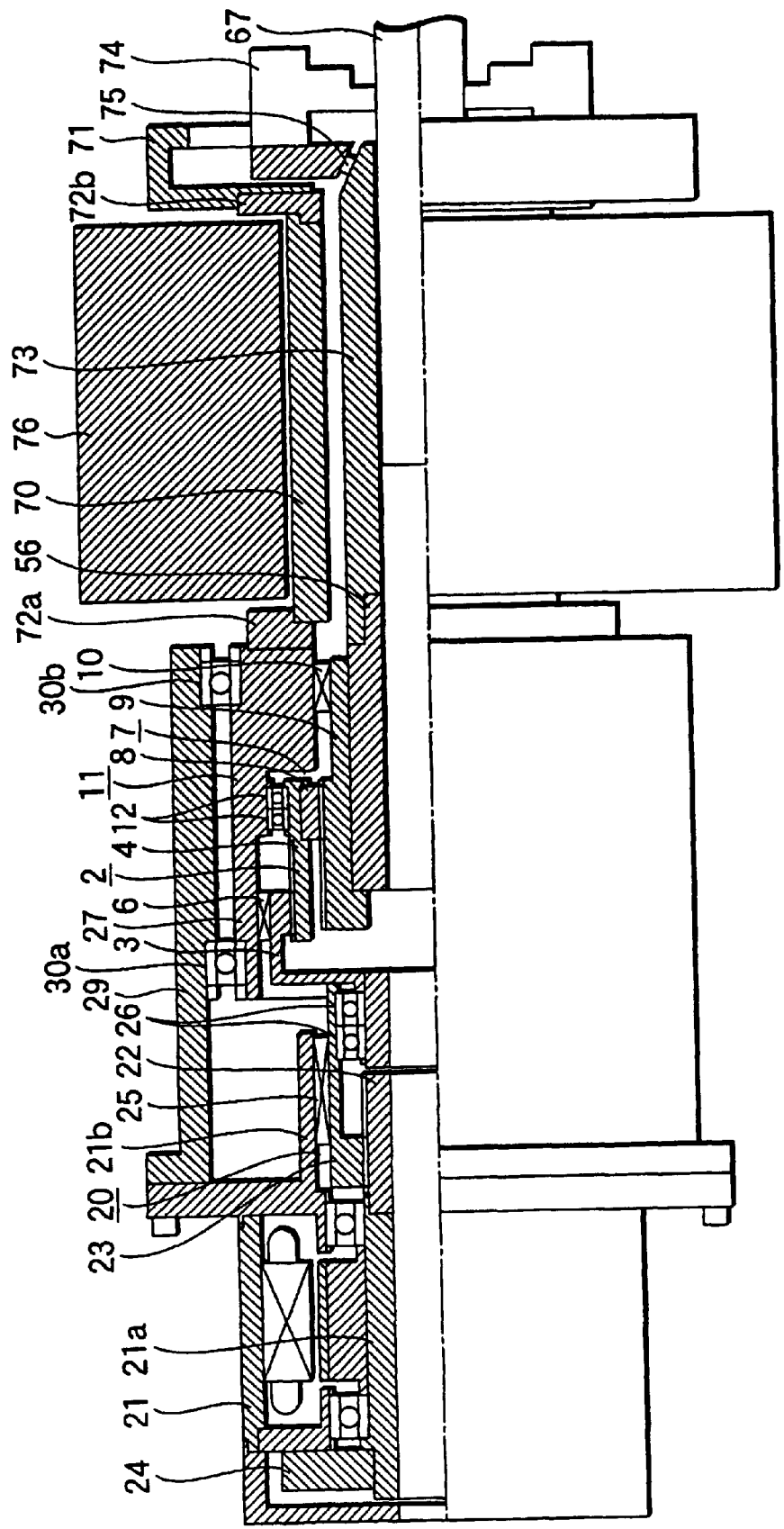
FIG. 5 is a fragmentary longitudinal cross-sectional view showing the construction of a chucking apparatus to which a thrust converter according to a fourth embodiment of the present invention is applied.

FIG. 5 is a fragmentary transverse cross-sectional view of a chucking apparatus to which a thrust converter is applied, and reference numerals which are the same as those shown in FIG. 3 in connection with the second embodiment designate identical or corresponding elements.

In the second and third embodiments, the motor 21 is fixed to the main spindle motor section 76 by way of the mount frame 28, thereby indirectly supporting the motor rotation-reciprocation conversion section 20, the reciprocation-rotation conversion section 2, the rotation-reciprocation conversion section 7, the reaction-force receiving section 11, and the second shaft bearing 26. As shown in FIG. 5, in the fourth embodiment, the main rotary shaft 27 is fixed on a motor support frame 29 fastened to the motor-load-side bracket 21b, by way of shaft bearings 30a and 30b, so as to be rotatable but unable to move axially. Thereby, the motor rotation-reciprocation conversion section 20 is indirectly supported by the main spindle 27.

Figure 14:
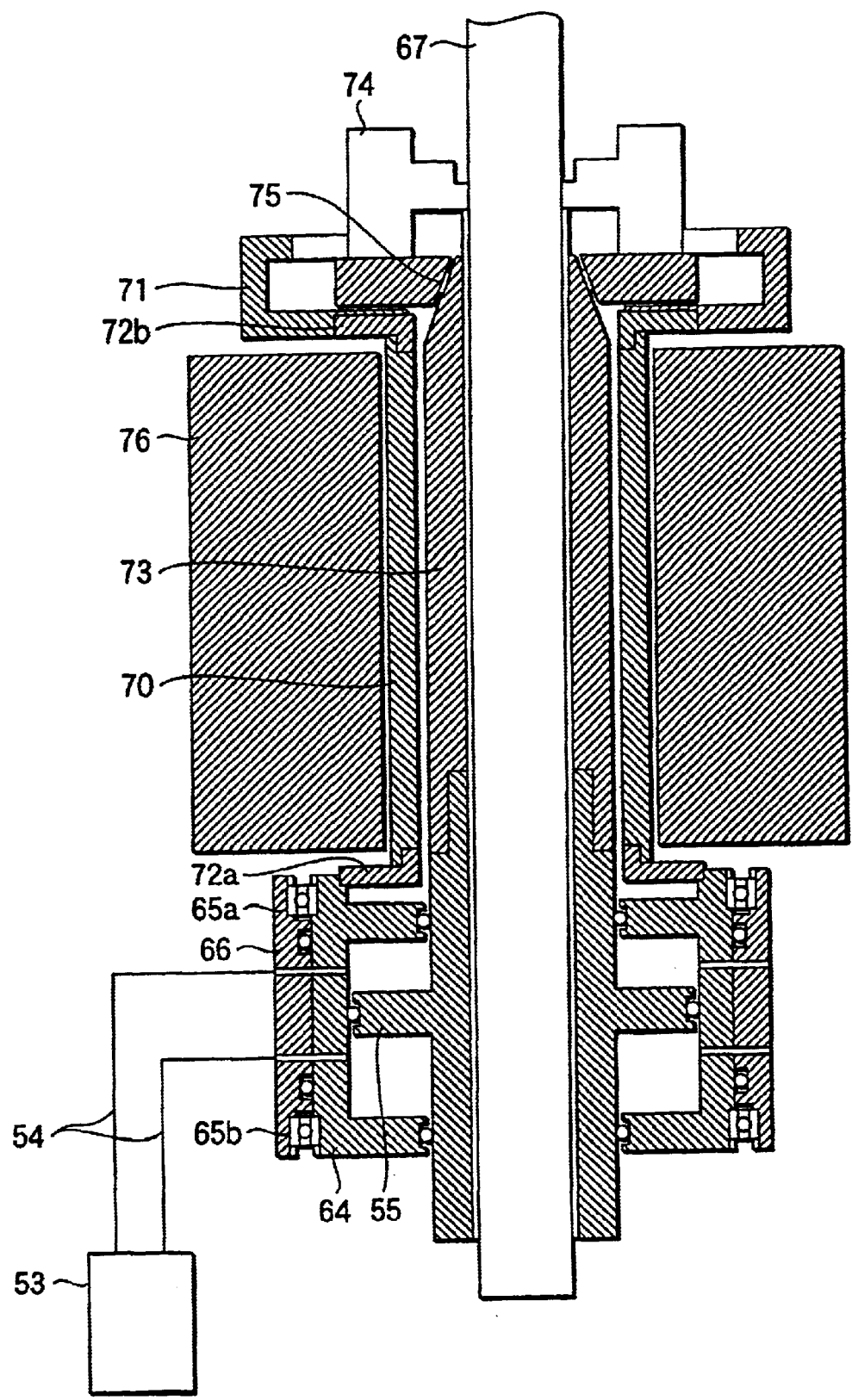
FIG. 14 is a fragmentary longitudinal cross-sectional view showing the construction of a related-art chucking apparatus.

The main rotary shaft 27 is fastened to the rear extremity of the main spindle 70 via the adapter 72a. The related-art rotary hydraulic cylinder 64 shown in FIG. 14 can be fastened to a chuck drive device according to the fourth embodiment (i.e., a left portion of the chuck drive device relative to the adapter 72a shown in FIG. 5) in the same manner in which the rear extremity of the main spindle 70 is fastened by way of the adapter 72a, thereby enabling easy retrofitting.

Needless to say, the fourth embodiment can be applied to the third embodiment.

Fifth Embodiment

A fifth embodiment of the present invention will be described by reference to FIG. 6.

Figure 6:
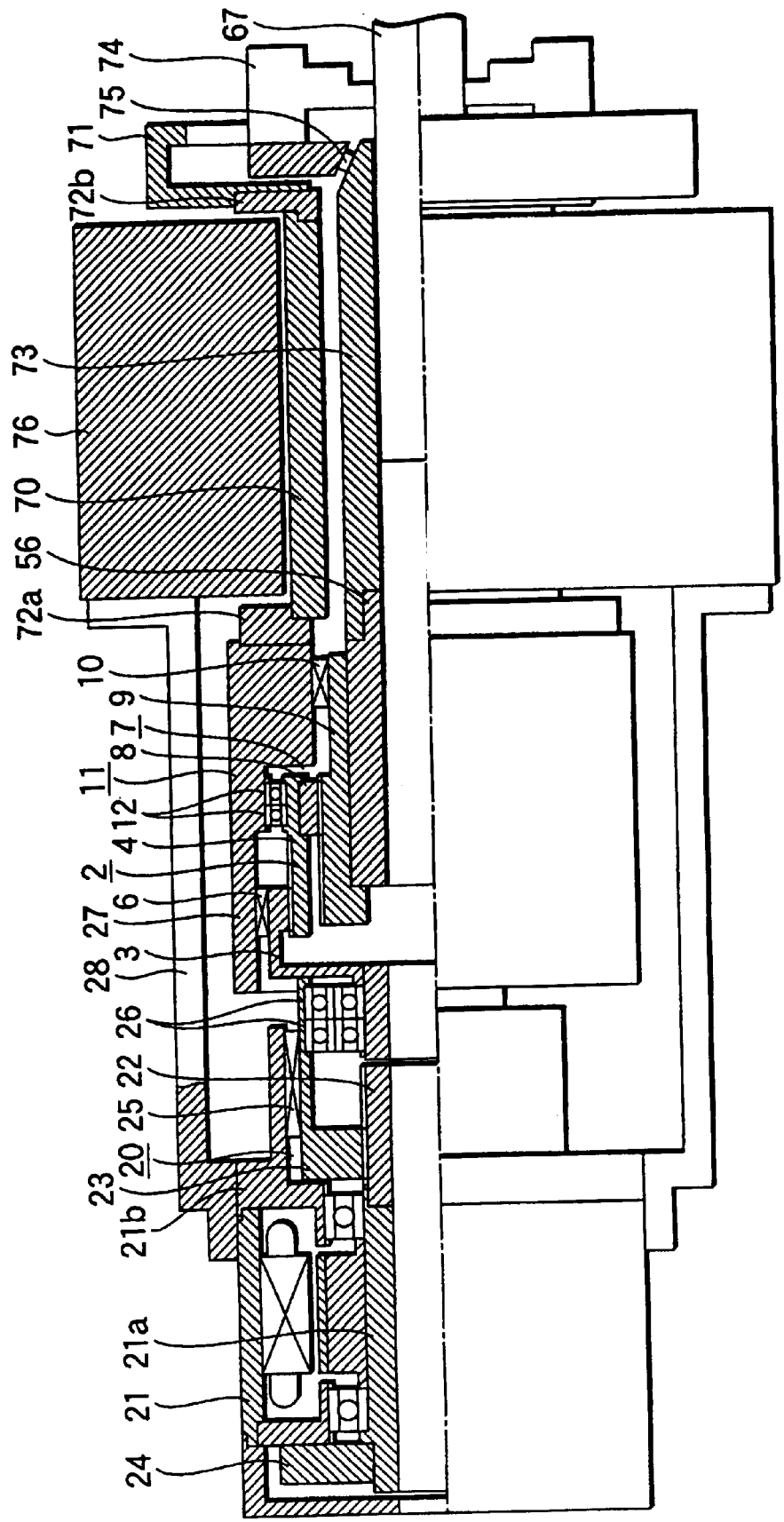
FIG. 6 is a fragmentary longitudinal cross-sectional view showing the construction of a chucking apparatus to which a thrust converter according to a fifth embodiment of the present invention is applied.

FIG. 6 is a fragmentary transverse cross-sectional view of a chucking apparatus to which a thrust converter is applied, and reference numerals which are the same as those shown in FIG. 3 in connection with the second embodiment designate identical or corresponding elements.

In the sixth embodiment, the second shaft bearing 26 has a double bearing structure, in which a ball bearing is fitted around a bearing outer ring. Inner and outer balls undergo rotation of the main spindle at a rate representing a fifty percent reduction in the number of revolutions of the main spindle. As a result, the number of allowable revolutions of the second shaft bearing 26 is increased, thereby enabling high-speed rotation of the main spindle. Load exerted on the balls provided on the inner and outer balls or on adjacent balls in the direction of thrust is reduced by one-half, thereby extending the life of a ball bearing.

Needless to say, the fifth embodiment can be applied also to the third and fourth embodiments.

Sixth Embodiment

A sixth embodiment of the present invention will now be described by reference to FIG. 7.

Figure 7:
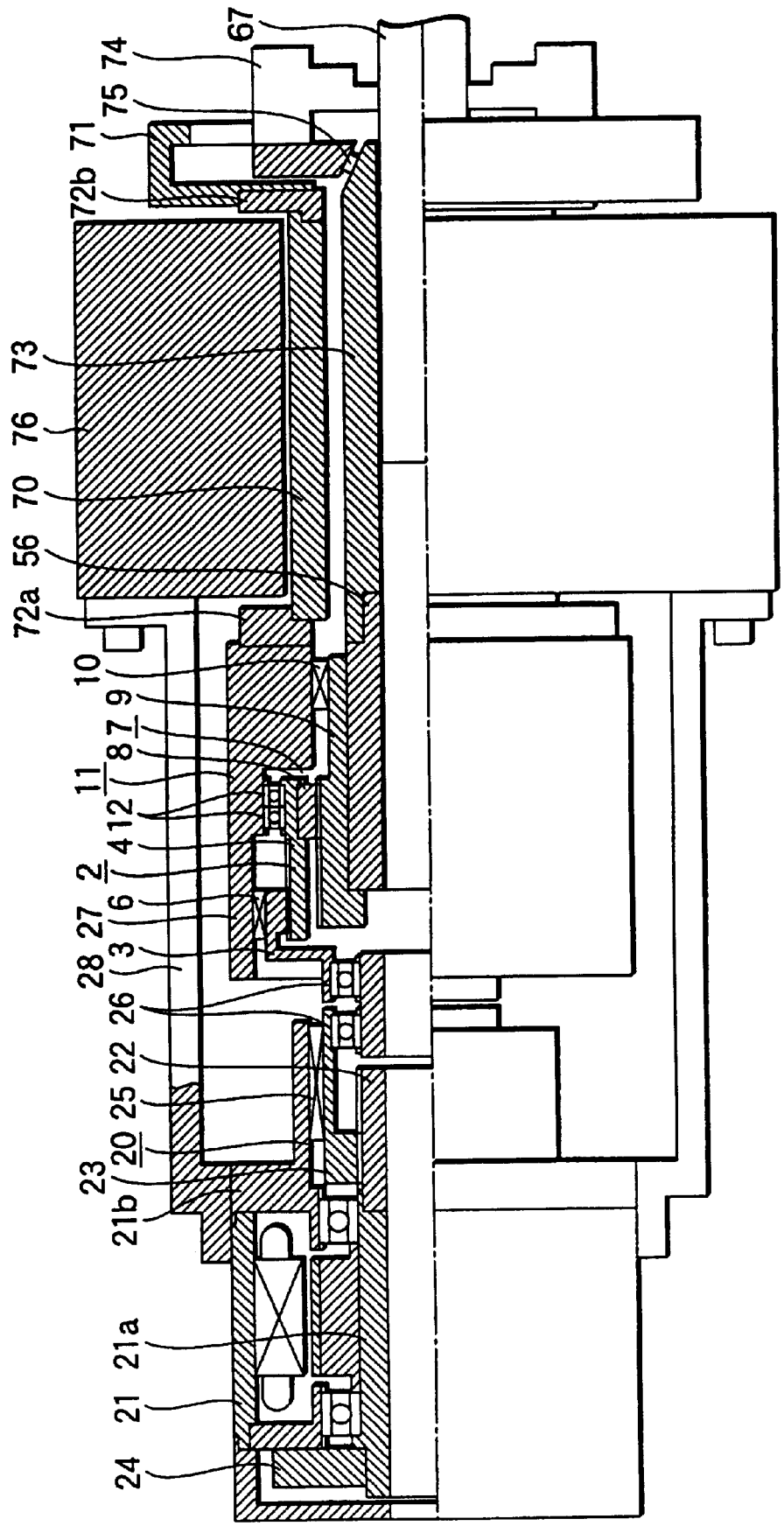
FIG. 7 is a fragmentary longitudinal cross-sectional view showing the construction of a chucking apparatus to which a thrust converter according to a sixth embodiment of the present invention is applied.

FIG. 7 is a fragmentary transverse cross-sectional view of a chucking apparatus to which a thrust converter is applied, and reference numerals which are the same as those shown in FIG. 3 in connection with the second embodiment designate identical or corresponding elements.

In the embodiment shown in FIG. 7, two second shaft bearings 26 are provided so as to be aligned in the axial direction. Inner rings are joined together, thereby constituting a double bearing structure.

As a result, the number of allowable revolutions of the second shaft bearings 25 is increased, thereby enabling high-speed rotation of the main spindle. Load exerted on the inner and outer balls or on adjacent balls in the direction of thrust is reduced by one-half, thereby extending the life of a shaft bearing.

Needless to say, the sixth embodiment can be applied also to the third and fourth embodiments.

Seventh Embodiment

The respective embodiments have described the chucking apparatus in which the first screw shaft 4 is to be screw-engaged with the first nut 3. These elements may be reversed. In other words, the first nut 3 may be a screw shaft, and the first screw shaft 4 may be a nut member.

Although an explanation has been given of the chucking apparatus in which the second nut 8 is secured on the first screw shaft 4, a screw section may be formed in the first screw shaft 4 without involvement of fastening of the second nut 8, thereby causing the screw section to play the role of the second nut 8.

Needless to say, the first nut 3, the first screw shaft 4, the second nut 8, and the second screw shaft 9 may be formed from a ball screw, a sliding screw, or a trapezoidal screw.

Examples in which the linear guide 6 and the linear guide 10 are applied to a detent mechanism have been described. However, a ball spline or a slide key may be applied to a detent mechanism.

Eighth Embodiment

An eighth embodiment of the present invention will now be described by reference to FIGS. 8 through 11.

Figure 8:
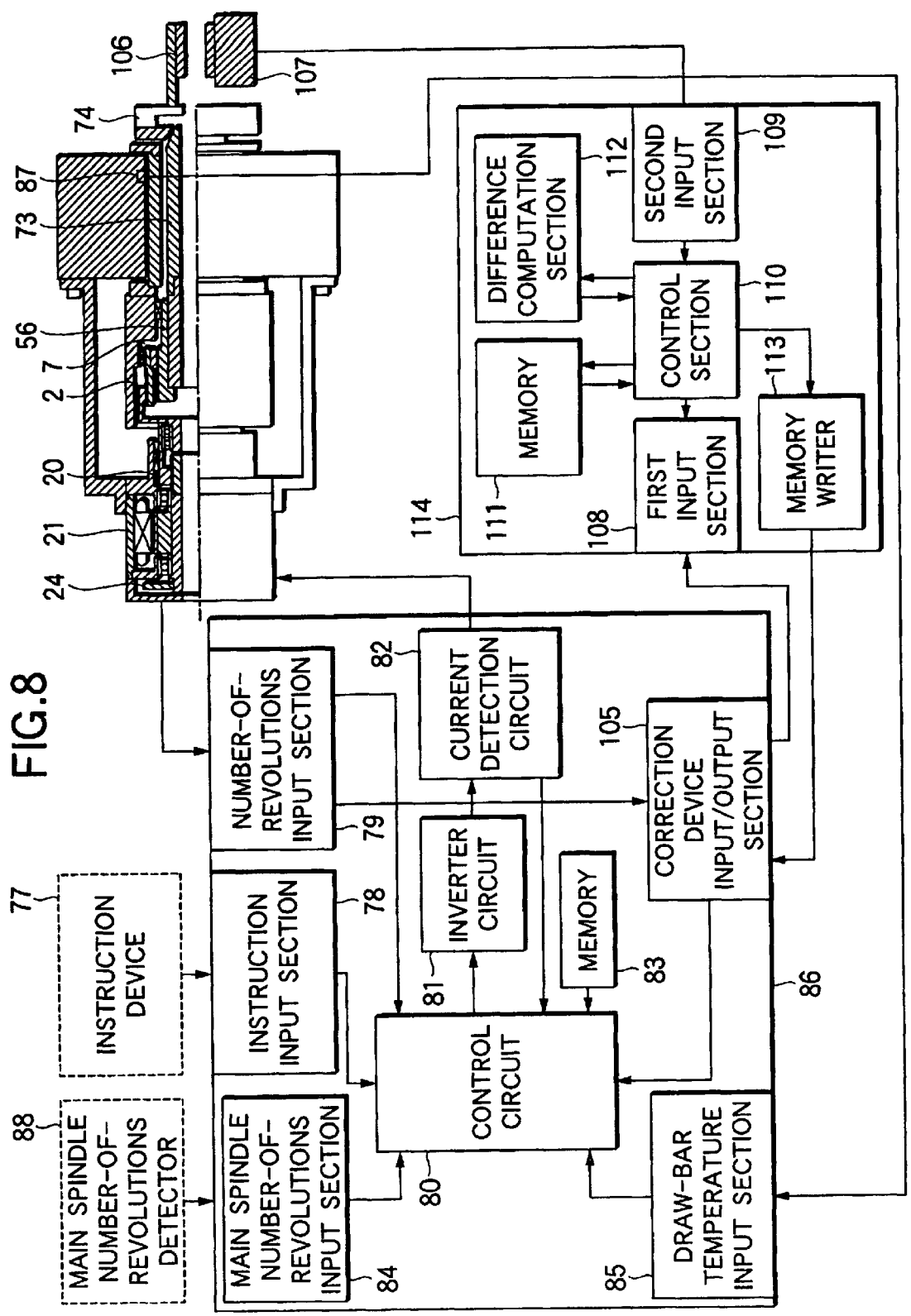
FIG. 8 is a fragmentary longitudinal cross-sectional view showing the construction of a chucking apparatus to which a thrust converter according to an eighth embodiment of the present invention is applied.

The eighth embodiment relates to a controller for controlling the lathe chucking apparatus to which any of the thrust converters described in connection with the second through seventh embodiments has been applied. FIG. 8 is a block diagram of a controller according to the eighth embodiment. In the drawing, an instruction device 77 is a controller of higher level than that of a control device 86. An instruction issued from the instruction device 77 enters a control circuit 80 via the instruction input section 78. The number of rotations of the motor 21 is detected by the rotary position detection section 24, and the thus-detected number of revolutions is input to the control circuit 80 from a number-of-revolutions input section 79. The electric current supplied to the motor 21 from the control circuit 80 is detected by a current detection circuit 82. The control circuit 80 activates an inverter circuit 81, thereby driving the motor 21. In order to activate the thrust converter with a high degree of accuracy, the number of revolutions of the main spindle motor detected by a main spindle number-of-revolutions detector 88 provided in the main spindle motor is input to the control circuit 80 by way of a main spindle number-of-revolutions input section 84. Data pertaining to a temperature sensor 87 mounted in the vicinity of the push-pull rod 56 or the draw bar 73 are input to the control circuit 80 by way of a draw-bar temperature input section 85.

As shown in FIG. 8, reference numeral 83 designates memory in which is stored a relationship between a pitch error correction value, a temperature correction coefficient, variations in temperature, and the amount of thermal strain. Reference numeral 105 designates a correction device input/output section; 106 designates a reflection mirror to be provided along with the chuck claws 74; and 107 designates a laser measuring machine for measuring the amount of movement of the chuck claws 74 through use of the reflection mirror 106. Reference numeral 114 designates a second controller. The second controller 114 is constituted of a first input section 108; a second input section 109, memory 111; a difference computation circuit 112; a control section 110; and a memory writer 113.

The reflection mirror 106, the laser measuring machine 107, and the second controller 114 are for measuring a positional error in the thrust converter and storing, into the memory 83, a correction value computed on the basis of a measured value. After the correction value has been stored in the memory 83, the reflection mirror 106, the laser measuring machine 107, and the second controller 114 are removed from the chucking apparatus. When the chucking apparatus is actually used, the reflection mirror 106, the laser measuring machine 107, and the second controller 114 are not used.

Figure 10:
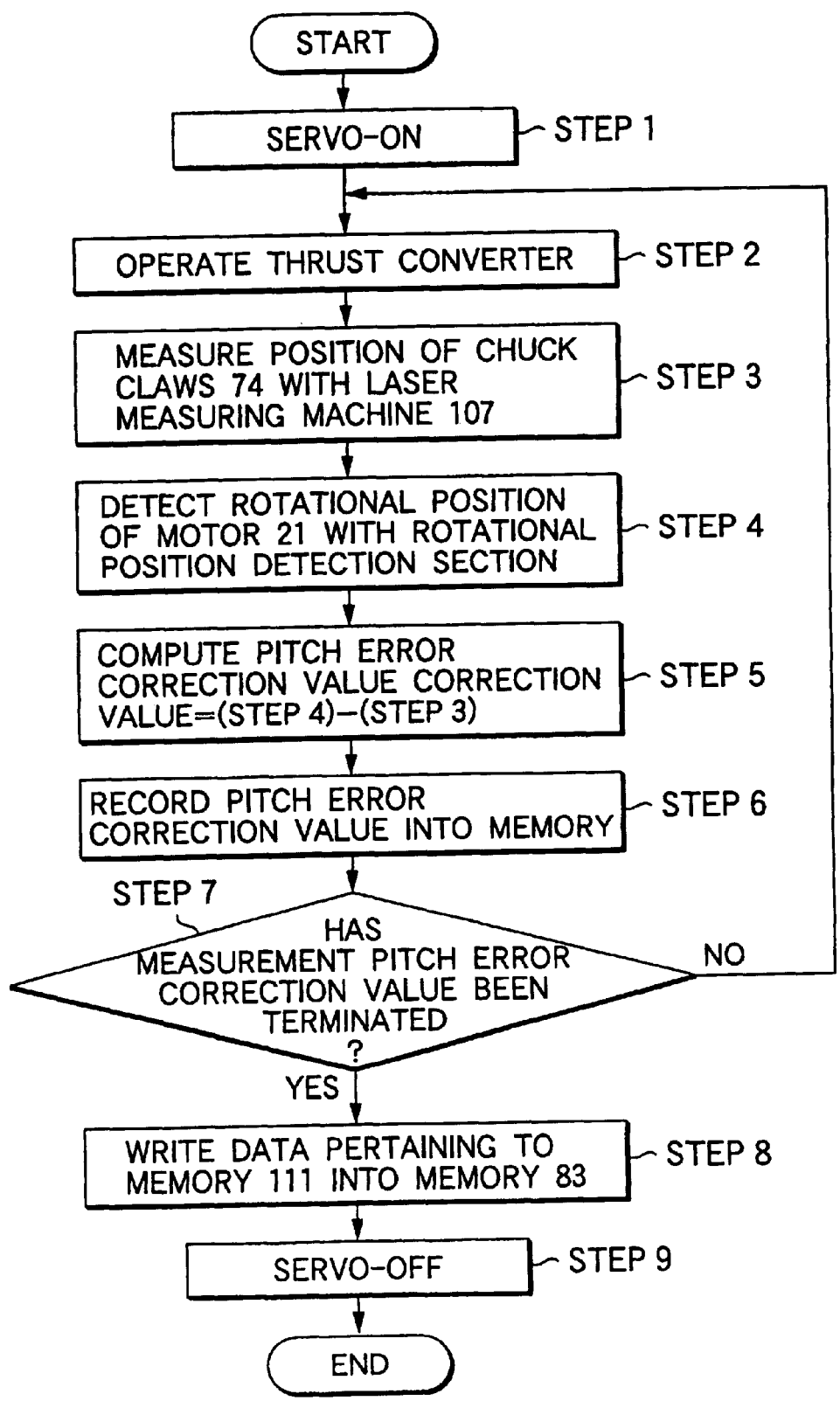
FIG. 10 is a flowchart for describing the operation of the thrust converter according to the eighth embodiment.

By reference to a flowchart shown in FIG. 10, there will now be described operations for computing a correction value relating to a positional error in the thrust converter through use of the rotational position signal output from the reflection mirror 106, the laser measuring machine 107, the second controller 114, and the rotational position detection section 24 and operations for storing the correction value in the memory 83.

When a test operation pattern is output as an instruction to the controller 86 from the instruction device 77, the controller 86 operates the thrust converter by means of servo-controlling the motor 21 (i.e., brings the motor 21 into a servo-on state) in accordance with the instruction (steps 1 and 2). By means of operating the thrust converter, the chuck claws 74 are moved by means of the operating function of the thrust converter in the manner as described in connection with the second embodiment. The amount of movement of the chuck claws 74 is detected by the laser measuring machine 107 detecting the light reflected from the reflection mirror 106 (step 3). The thus-detected amount of movement is output to the control section 110 as current position data by way of the second input section 109 of the second controller 114. The rotational position signal output from the rotational position detection section 24 is output to the control section 110 by way of the amount-of-rotation input section 79 of the first controller 86, the correction device input/output section 105, and the first input section 108 of the controller 114 (step 4). Under control of the control section 110, the current position data and the rotational position data are output to the difference computation circuit 112.

In accordance with a sampling instruction output from the control section 110, the difference computation circuit 112 computes from the rotational position data and the current position data a pitch error correction value relating to the sampled locations (step 5). The thus-computed pitch error correction value is stored in the memory 111 (step 6). A determination is made as to whether or not measurement of the pitch error correction value has been terminated (step 7). If measurement of a pitch error correction value has not yet been terminated, operations pertaining to steps 2 through 6 are iterated. After measurement of the pitch error correction value, the pitch error correction value stored in the memory 111 is output to the memory writer 113. The memory writer 113 writes the correction value into the memory 83 provided in the controller 86, by way of the correction device input/output section 105 (step 8). Finally, the motor 21 is stopped (brought into a servo-off state) (step 9). Thus, the correction value measurement operation is terminated.

When the thrust converter operates the chucking apparatus after completion of the correction value measurement operation, the chucking apparatus is used while the laser measuring machine 107, the reflection mirror 106, and the second controller 114 are removed.

In association with rotation of the motor 21, the control circuit 80 of the first controller 86 modifies the correction value recorded in the memory 83 through addition, on the basis of the instruction input from the instruction input section. The motor 21 is operated while the corrected instruction value is taken as an instruction. Since the operation is based on the instruction which has taken the error into account, an error between the instruction from the instruction device 77 and the position of the chuck claws is eliminated, thereby enabling high-precision control of the chuck claws.

Figure 9:
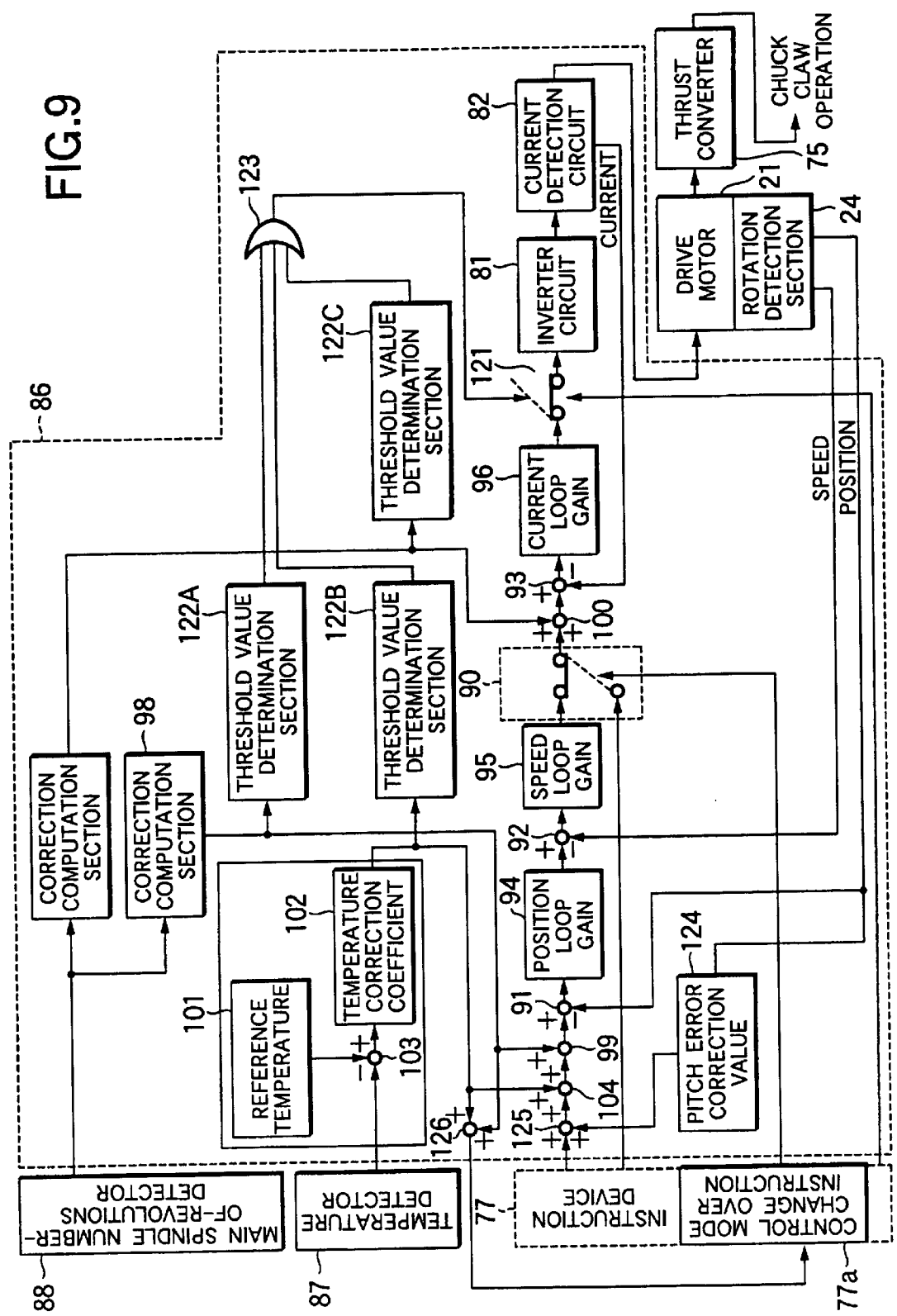
FIG. 9 is a control block diagram showing the thrust converter according to the eighth embodiment.
Figure 11:
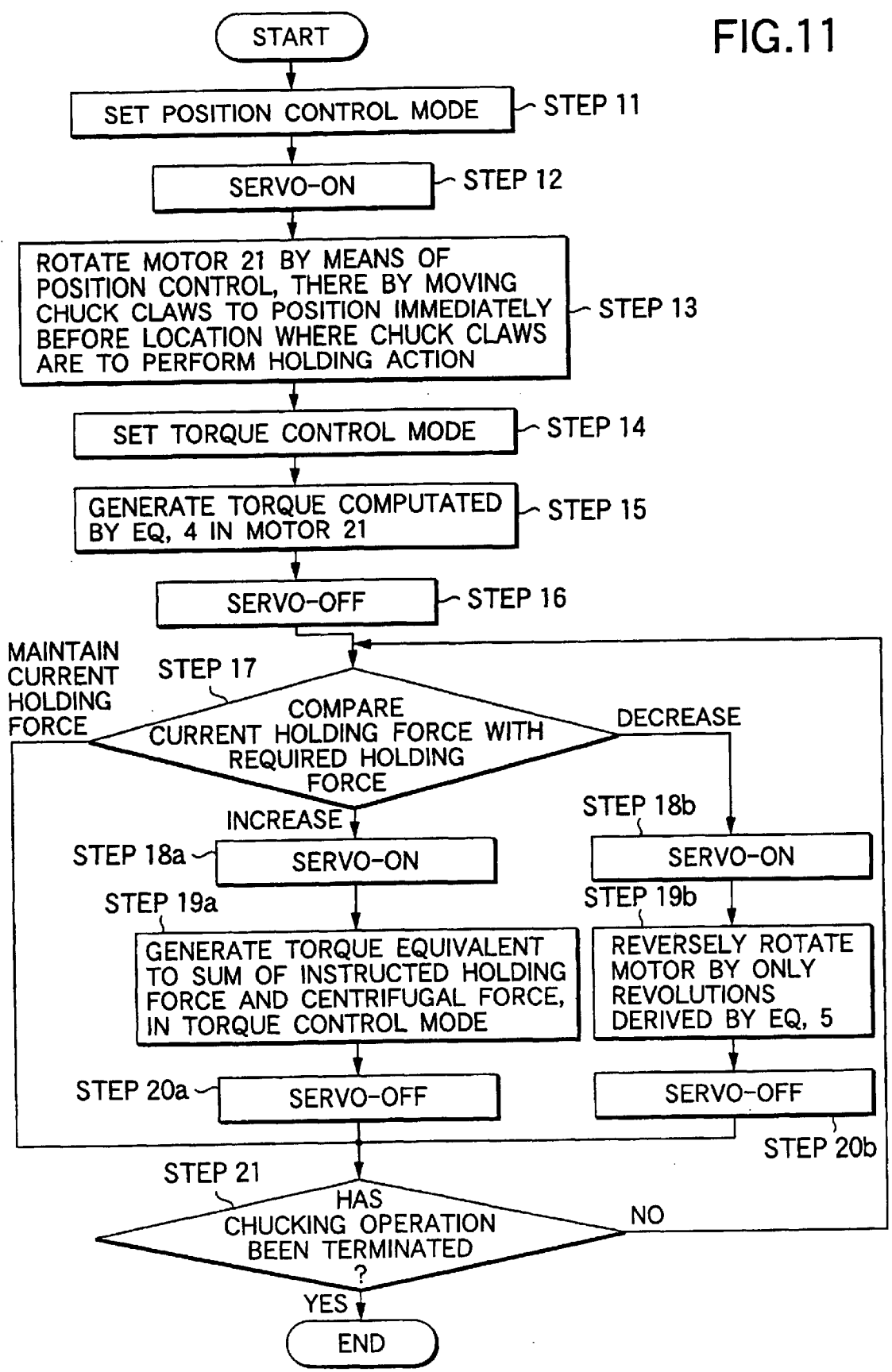
FIG. 11 is a flowchart for describing the operation of the thrust converter according to the eighth embodiment.

Operations of a controller for controlling a lathe chucking apparatus to which the thrust converter according to the eighth embodiment is applied will now be described by reference to FIGS. 9 and 11. FIG. 9 is a diagram of a control block shown in FIG. 8, and FIG. 11 is a flowchart showing the operation of the controller.

The control block diagram shown in FIG. 9 will now be described.

A control mode changeover switch 90 is switched in accordance with a control mode changeover instruction 77a from the instruction device 77. When the motor 21 is operated in a torque control mode, the control mode changeover switch 90 is brought into a state indicated by a broken line shown in FIG. 9. Further, the changeover switch 121 enters a state indicated by a solid line, in accordance with the instruction from the instruction device 77 or outputs produced by threshold value determination sections 122A through 122C by way of an OR circuit 123. A torque instruction is input to the chucking apparatus from the instruction device 77, and the electric current flowing through the motor 21 is controlled by means of current feedback control, thereby producing required torque. The current feedback control is implemented by a differential circuit 93, a current loop gain 96, the inverter circuit 81, and the current detection circuit 82. The differential circuit 93 determines a difference between the instruction and the current detected by the current detection circuit 82. The difference is multiplied by the current loop gain 96, thereby implementing feedback control. The inverter circuit 81 is driven by means of a PWM output, thereby operating the motor 21. The torque developing in the motor 21 is transmitted to the chuck claws 74 by way of the thrust converter, thereby causing given chuck claw holding force without regard to the positions of the chuck claws.

When the motor 21 is controlled in a position control mode, the control mode changeover switch 90 enters the state indicated by the solid line in FIG. 9. Further, the changeover switch 121 enters the state indicated by a solid line in accordance with an instruction from the instruction device 77 or outputs from the threshold value determination sections 122A through 122C by way of the OR circuit 123. The position instruction output from the instruction device 77 is input to the chucking apparatus, and the rotational position of the motor 21 is controlled by means of position feedback control. Position feedback control is implemented by means of a differential circuit 91, a position loop gain 96, speed feedback control, and the rotational position detection section 24. The differential circuit 91 determines a difference between the instruction and the position detected by the rotational position detection section 24. The difference is multiplied by the current loop gain 96, thereby implementing feedback control. The motor 21 is driven while speed feedback control is taken as a minor loop. The speed feedback control is implemented by a differential circuit 92, a speed loop gain 96, and current feedback control. The differential circuit 92 determines a difference between the instruction and the speed computed from the position detected by the rotational position detection section 24 through time differential. The difference is multiplied by the speed loop gain 95, thereby realizing feedback control. The motor 21 is operated by means of taking current feedback control as a minor loop. Operations for effecting current feedback control are as follows:

In a position control mode, an adder circuit 99 adds the rotational speed detected by the main spindle rotation detector 88 to the instruction by way of correction computation sections 97 and 98. In a torque control mode, an addition circuit 100 adds the rotational speed detected by the main spindle rotation detector 88 to the instruction. The correction computation sections 97 and 98 compute a value by means of multiplying the square of the main spindle rotational speed by a proportionality factor; that is, a correction value corresponding to centrifugal force. In the position control mode, the amount of correction corresponding to strain in the draw bar induced by centrifugal force is computed. Details of the correction computation sections 97 and 98 will be described later.

Outputs from the correction computation sections 97 and 98 are output also to the threshold value determination sections 122A and 122C. When the amount of correction exceeds a predetermined threshold value; that is, when correction is determined to be required, the threshold value determination sections 122A and 122C produce outputs, thereby switching the changeover switch 121 to a position indicated by the solid line, by way of the OR circuit 123.

A differential circuit 103 computes temperature variations from the temperature detected by the temperature detector 87 and a reference temperature 101. The temperature variations are multiplied by a temperature correction coefficient (i.e., a coefficient of expansion) 102, thereby determining a correction value for correcting variations in the positions of the chuck claws due to thermal expansion. An adder circuit 104 adds the correction value to the instruction, thereby correcting errors in the positions of the chuck claws due to temperature variations.

The correction value is output also to the threshold value determination section 122B. When the correction value has exceeded a predetermined threshold value; that is, when correction is determined to be required, the threshold value determination section 122B switches the changeover switch 121 to the position indicated by the solid line, through the OR circuit 123.

An adder circuit 126 adds the chuck-claw-position variation correction value to the amount of correction relating to the number of revolutions of the main spindle computed by the amount-of-amount-of-correction computation section 98. The result of addition is input to the instruction device 77. In accordance with the result of addition performed by the adder circuit 126, the instruction device 77 switches the control mode changeover switch 90, thereby bringing the chucking apparatus into either a torque control mode or a position control mode.

When temperature varies within a narrow range, temperature variations can become analogous to a coefficient of expansion employed where a linear relationship exists between temperature variation and a coefficient of expansion. As mentioned above, the temperature amount-of-correction computation section 105 outputs a value proportional to temperature variation. However, when a non-linear relationship exists between thermal strain in the push-pull rod 56 or draw bar 73 and temperature variation, the relationship between temperature variation and the amount of thermal strain may be recorded in the memory 83. A correction value may be read. For instance, an operation guarantee temperature is set to a range of 0° C. to 50° C. With reference to 0° C., a coefficient of expansion at a temperature of 10° C. is stored in an address a[1] of the memory 83; a coefficient of expansion at a temperature of 20° C. is stored in an address a[2] of the memory 83; a coefficient of expansion at a temperature of 30° C. is stored in an address a[3] of the memory 83; a coefficient of expansion at a temperature of 40° C. is stored in an address a[4] of the memory 83; and a coefficient of expansion at a temperature of 50° C. is stored in an address a[5] of the memory 83. Provided that data pertaining to an address a[i] of the memory 83 (where "i" is an integer within a range of 1 through 5) are taken as d[a[i]] and a measured temperature is taken as T, a coefficient of expansion at temperature T is computed as $$\text{Coefficient of expansion at temperature } T = d[a[\text{Floor}(T/10)]]$$

where "Floor" is a function for dropping a fractional portion of a number.

Alternatively, when the measured points are linearly approximated, the accuracy of computation can be further improved, as indicated by $$\text{Coefficient of expansion at temperature } T = (d[a[\text{Floor}(T/10+1)]] - d[a[\text{Floor}(T/10)]]) * (T - 10 * \text{Floor}(T/10))/10 + d[a[\text{Floor}(T/10)]].$$

The chucking apparatus is controlled by means of the foregoing controller in such a manner as shown in FIG. 11.

First, the control mode changeover switch 90 is switched by means of the instruction device 77 to the position indicated by the solid line. Further, the changeover switch 121 is switched to the position indicated by the solid line, thereby setting the chucking apparatus into a position control mode (step 11). Next, the motor 21 is subjected to servo-on operation (step 12). The chucking apparatus is operated in a position control mode just before the chuck claws 74 hold the workpiece 67 (step 13). Subsequently, in order to hold the workpiece 67 with appropriate holding force by means of controlling holding force, the instruction device 77 switches the control mode changeover switch 90 to the position indicated by the dotted line (step 14), thereby operating the motor 21' in a torque control mode in which required torque is produced (step 15).

Provided that lead length between the third screw shaft 22 and the third nut 23 is taken as L3, a rotation linear conversion efficiency is taken as η3, a motor torque is taken as Tm, a ratio between the movement of the draw bar 73 and the movement of the chuck claws 74 is taken as R, an efficiency for converting thrust of the draw bar 73 into a holding force of the chuck claws 74 is taken as η4, and the holding force is taken as F, the required torque can be expressed as follows by means of Eqs. 1 and 2.

$$Tm = L2 \cdot L3 \cdot R \cdot F / (2\pi \cdot L1 \cdot \eta1 \cdot \eta2 \cdot \eta3 \cdot \eta4) \tag{Eq. 4}$$

After generation of holding force required for causing the torque to develop in the motor 21, the motor 21 is subjected to servo-off operation, (step 6). At the time of servo-off operation, the instruction device 77 switches the changeover switch 121 to the position indicated by the solid line. Even when the torque is caused to arise in the motor 21 and the motor 21 is subjected to servo-off operation after generation of required holding force, the second screw shaft 9 assumes a negative efficiency and remains in a self-locked state. Hence, the holding force of the chuck is maintained.

As has been described in connection with the second embodiment, provided that the friction factor of a screw is taken as μ, a screw lead angle β between the second nut 8 and the second screw shaft 9 to be screw-engaged with the second nut 8 assumes a relationship tan β<μ. In relation to the screw satisfying the conditional expression, a conversion efficiency for converting thrust to rotational torque assumes a negative conversion efficiency. Converting rotational torque into axial thrust by means of imparting rotational torque to a screw is possible. However, converting axial thrust into rotational torque by means of imparting axial thrust to the screw is impossible.

If the main spindle motor 76 for machining the workpiece 67 is operated at high speed after holding of the workpiece 67, centrifugal force acts on the chuck claws 74, and the holding force drops in accordance with the stiffness of the draw bar 73 or that of the push-pull rod 56. Therefore, the instruction device 77 switches the control mode changeover switch 90 to the position indicated by the dotted line (i.e., a torque control mode), by means of grasping an increase in the number of revolutions of the main spindle. At this time, the current holding force is compared with required holding force (step 17). If there is a necessity for increasing the holding force, the changeover switch 121 is switched to the position indicated by the solid line, by means of an output from the threshold value determination section 122C, thereby subjecting the motor 21 to servo-on operation (step 18a). A distribution of centrifugal force proportional to the square of the number of revolutions of the main spindle is added to a torque instruction, thereby increasing the holding force (step 19a). After completion of an increase in the holding force, no output is produced by the threshold value determination section 122C. As a result, the changeover switch 121 is switched to the position indicated by the dotted line, thereby bringing the motor 21 into a servo-off operation (step 20a). The amount of correction corresponding to the centrifugal force is computed by the amount-of-correction computation section 97 shown in FIG. 9.

When the main spindle motor 97 is decelerated or stopped after having rotated at high speed, the holding force that has been increased by an amount corresponding to the centrifugal force is exerted on the workpiece 67. In some cases, the workpiece 67 would be damaged. In order to prevent the damage, the instruction device 77 switches the control mode changeover switch 90 to the position indicated by the solid line (i.e., the position control mode), by means of grasping that the main spindle has decelerated or stopped. By means of an output from the threshold value determination section 122A, the changeover switch 121 is switched to the position indicated by the solid line, thereby subjecting the motor 21 to servo-on operation (step 18b). The motor 21 is reversely-rotated by only the amount derived from the following equation, thereby weakening the holding force (step 19b).

$$\Delta = C(\omega_1{}^{2-\omega 2})/k \qquad \text{(Eq. 5)}$$

where C is the moment of inertia of the chuck claws, ω is an angular velocity of the main spindle motor when previous holding force has developed, ω1 is a current angular velocity of the main spindle motor, "k" is the elastic modulus of the draw bar 73 and the push-pull rod 56, $C \cdot \omega^2$ is centrifugal force, and Δ is the amount of stress distortion. When the motor 21 is reversely rotated by only Δ so as to weaken the holding force, no output is produced by the threshold value determination section 122A. The changeover switch 121 is switched to the position indicated by the dotted line, thereby subjecting the motor 21 to a servo-off operation (step 20b). While the chuck claws 74 are in a holding state; that is, a machining state, the holding status is monitored constantly (step 21). Hence, operations pertaining to steps 17 through 21 are iterated. Computation represented by Eq. 5 is performed by the amount-of-correction computation section 98 shown in FIG. 9.

When the number of revolutions of the main spindle has increased, there is a necessity of driving the motor 21 in a direction for closing the chuck claws. When the temperature of the draw bar rises during the course of an increase in the number of revolutions of the main spindle, the chuck claws are closed. Hence, even when the number of revolutions of the main spindle has increased, the motor 21 cannot be indiscriminately driven in the direction for closing the chuck claws. In some occasions, even in a case where an increase has arisen in the number of revolutions of the main spindle, there arises a necessity of driving the motor 21 in a direction for closing the chuck claws.

In the eighth embodiment, the adder circuit 126 adds the amount of correction required for correcting variations in the positions of the chuck claws arising at the detected temperature to the amount of correction pertaining to the number of revolutions of the main spindle computed by the amount-of-correction computation section 98. In accordance with the result of addition performed by the adder circuit 126, the instruction device 77 switches the control mode changeover switch 90 to either a torque control mode or a position control mode.

In other words, if the result of addition performed by the adder circuit 126 represents a direction for closing the chuck claws, the instruction device 77 switches the control mode changeover switch 90 to the position indicated by the dotted line (i.e., the torque control mode). If the result of addition represents a direction for opening the chuck claws, the instruction device 77 switches the control mode changeover switch 90 to the position indicated by the solid line (i.e., the position control mode). Subsequent operations are the same as those described previously.

When the motor 21 is driven, a pitch error correction value 124 which has been produced by the laser measuring machine 107, the reflection mirror 106, and the second controller 114 and is stored in the memory 83 is read on the basis of the angular velocity output from the rotation detection section 24. The thus-read angular velocity is added to the adder circuit 125, thereby correcting a pitch error.

Ninth Embodiment

A ninth embodiment of the present invention will be described by reference to FIGS. 8 through 12.

The ninth embodiment relates to a controller for controlling a lathe chucking apparatus to which the thrust converter described in connection with the second through seventh embodiment is applied. The controller is employed when an instruction is given to the thrust converter by means of a manual instruction device (a pulse generator).

Figure 12:
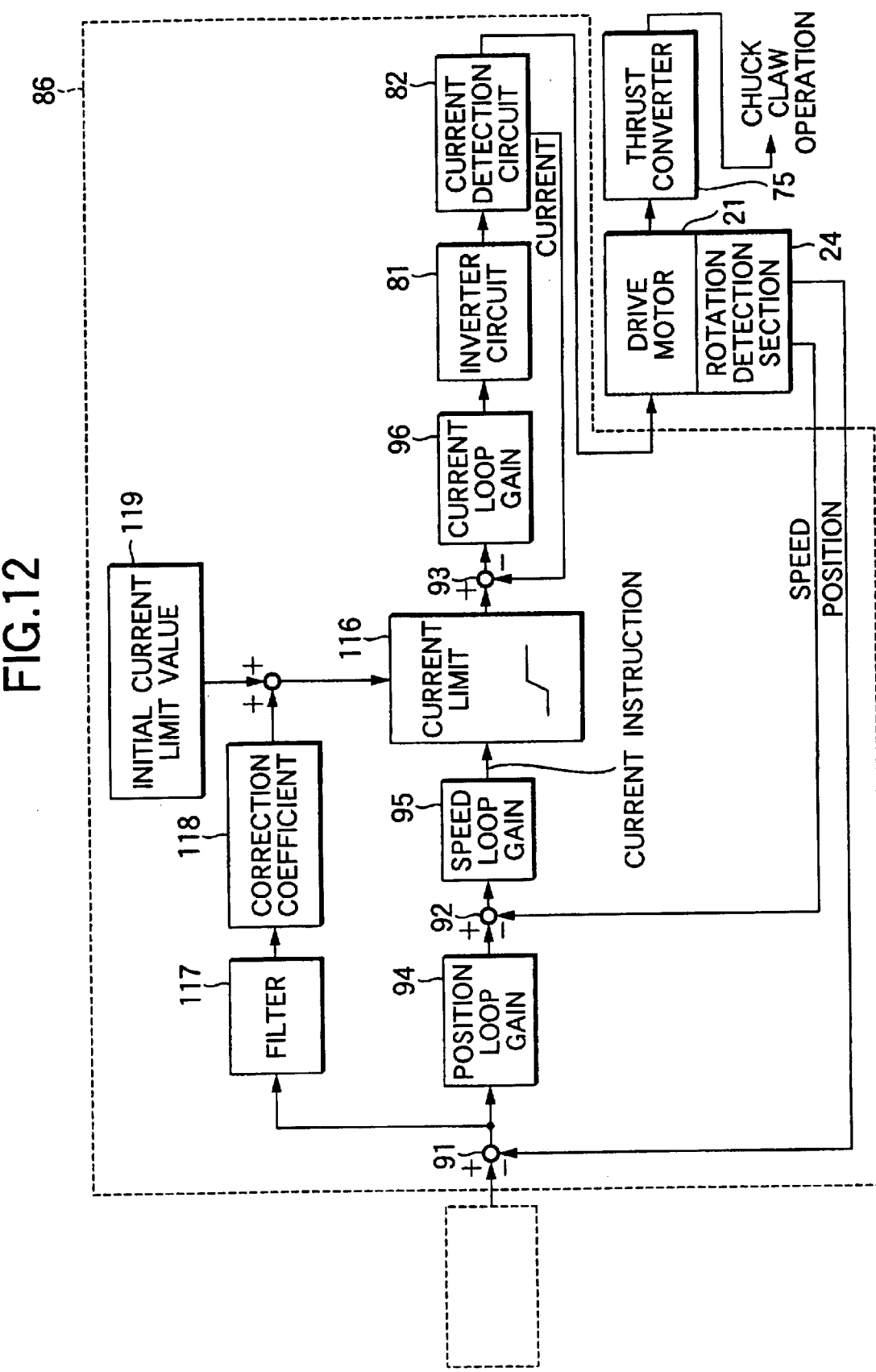
FIG. 12 is a control block diagram of a chucking apparatus to which the thrust converter according to a ninth embodiment of the present invention is applied.

FIG. 12 is a control block diagram of the lathe chucking apparatus. A manual instruction device 115 serving as a pulse generator inputs the position instruction to the controller 86. When the position instruction is input, a differential circuit 91 computes an error between an instructed position and an actual position. When chuck claws are in an open state, a positional error is nominal. A value proportional to the positional error (i.e., the product of an output from a filter 117 and a correction coefficient 118) and an initial current limit value 119 are added together by an adder circuit 120. The result of addition acts as a current limit value for a current limiter 116. If the chuck claws are in an open state, the positional error is nominal. Hence, the current limiter 116 assumes a value close to an initial current limit value 119. Since the chuck claws are in an open state, the load imposed on the motor 21 is small. A current instruction based on the position instruction is lower than the current limit value of the current limiter 116.

The chuck claws shift from an open state to a closed state. When an instruction is input to the controller 86 by means of the manual instruction device 115, the chucking apparatus is in a position control operation until the chuck claws are closed.

When the chuck claws are closed, even if a positional instruction is sent from the manual instruction device 115 to the controller 86, the chucking apparatus cannot follow the position instruction, because the chucking apparatus is holding the workpiece 67. As a result, a positional error increases. As mentioned above, the differential circuit 91 detects the positional error. The adder circuit 120 adds to the initial current limit value 119 a value proportional to the error (i.e., the product of an output from the filter 117 and the correction coefficient 118). The result of addition acts as a current limit value of the current limiter 116. In a state in which the chuck claws are closed, even if the manual instruction device 115 has sent a positional instruction to the controller 86, the chucking apparatus cannot follow the positional instruction, because the chucking apparatus is holding the workpiece 67. Eventually, the positional error becomes greater, and a current instruction output from the instruction device 115 exceeds the current limit value set by the current limiter 116. As a result, the electric current is controlled in accordance with the current limit value set by the current limiter 116.

More specifically, an output from the manual instruction device 77 acts as a torque instruction while the chuck claws are closed.

The present invention provides a thrust converter comprising:
  reciprocating movement means;
  reciprocation-rotation conversion means for converting reciprocating movement of the reciprocation movement means into rotational movement;
  rotation-reciprocation conversion means for converting rotational movement of the reciprocation-rotation conversion means into reciprocating movement; and
  reaction-force receiving means for supporting reaction force of reciprocating movement of the rotation-reciprocation conversion means. Hence, thrust imparted to the reciprocation movement means can be imparted to a load while being amplified or reduced, through employment of a compact and simple construction. So long as the thrust converter is applied to a press-working machine or a chuck drive machine, thereby providing a useful novel thrust converter.

Preferably, the reciprocation movement means, the reciprocation-rotation conversion means, the rotation-reciprocation conversion means, and the reaction-force receiving means are aligned in one line, and a through hole is formed so as to pass through the center axes thereof. Hence, there can be provided a thrust converter which can be applied to a lathe chuck for machining long materials.

Preferably, the reciprocation-rotation converter means comprises a first screw member to which axial thrust is imparted by the reciprocation movement means, a second screw member to be screw-engaged with the first screw member, and a first detent section for locking the first screw member so as to restrict movement to only an axial direction;
  the rotation-reciprocation conversion means comprises a screw section provided on the second screw member in a position different from the location of a screw section to be screw-engaged with the first screw member, a third screw member to be screw-engaged with the screw section, and a second detent section for locking the third screw member so as to restrict movement to only an axial direction; and
  the reaction-force receiving means comprises a substrate, the second screw member, and a first shaft bearing for supporting the second screw member on the substrate so as to allow rotation and to prohibit axial movement. The majority of the constituent elements can be formed from screw members, and hence there can be provided a low-cost thrust converter having superior productivity.

Preferably, the first screw member is supported by the reciprocation movement means by way of a second shaft bearing so as to be rotatable. Hence, the reciprocation movement means, the reciprocation-rotation conversion means, the rotation-reciprocation conversion means, and reaction-force receiving means can be separated from each other in a rotating direction with use of simple components. There can be provided a thrust converter applicable to a lathe chucking apparatus whose load rotates at high speed.

Preferably, the reciprocation movement means comprises a motor, and motor rotation-reciprocation conversion means for converting rotating movement of a shaft of the motor into reciprocating movement. There can be provided a thrust converter which has a good maintenance characteristic and which enables easy non-stage control of thrust to be output to a load with a simple construction.

Preferably, the reciprocation movement means comprises a motor, a fourth screw member provided on a load-side extremity of a shaft of the motor, a fifth screw member to be screw-engaged with the fourth screw member, a third detent section for locking the fifth screw member so as to restrict movement to only an axial direction, and motor rotation-reciprocation conversion means for converting the rotating movement of the shaft of the motor into reciprocating movement;
  the reciprocation-rotation conversion means comprises a first screw member supported by the fifth screw member so as to allow rotation and to prohibit axial movement by way of a second shaft bearing, a second screw member to be screw-engaged with the first screw member, and a first detent section for locking the first screw member so as to restrict movement to only the axial direction;
  the rotation-reciprocation conversion means comprises a screw section provided on the second screw member in a position different from the location of a screw section to be screw-engaged with the first screw member, a third screw member to be screw-engaged with the screw section, and a second detent section for locking the third screw member so as to restrict movement to only an axial direction; and
  the reaction-force receiving means comprises a substrate, the second screw member, and a first shaft bearing for supporting the second screw member on the substrate so as to allow rotation and to prohibit axial movement. The majority of the constituent elements can be formed from screw members, and hence there can be provided a low-cost thrust converter having superior productivity. Further, there can be provided a thrust converter which has a good maintenance characteristic and which enables easy non-stage control of thrust to be output to a load with a simple construction.

Preferably, the second detent section for locking the third screw member so as to restrict movement to only an axial direction is interposed between the third screw member and a first screw member. There can be provided a thrust converter having a shorter axial dimension.

Preferably, screw lead of the first screw member and screw lead of a second screw member to be screw-engaged with the first screw member are greater than screw lead of a screw section provided on the second screw member in a position different from the location of a screw section to be screw-engaged with the first screw member and greater than screw lead of a third screw member to be screw-engaged with the screw section. There can be provided a thrust converter which can produce great thrust on a load with a simple construction and a small thrust drive source and which can make the unit of amplification minute.

Preferably, screw lead of the first screw member and screw lead of a second screw member to be screw-engaged with the first screw member are smaller than screw lead of a screw section provided on the second screw member in a position different from the location of a screw section to be screw-engaged with the first screw member and smaller than screw lead of a third screw member to be screw-engaged with the screw section. There can be provided a thrust converter which can impart thrust to a load while reducing the load with a simple construction and a small thrust drive source and which can make the unit of amplification minute.

Preferably, provided that a screw lead angle between a screw section which is formed on the second screw member in a location different from that of a screw section to be screw-engaged with the first screw member and a third screw member to be screw-engaged with the screw section is taken as $\beta$ and a coefficient of friction of a screw is taken as $\mu$, a screw is formed so as to assume a relationship tan $\beta < \mu$. Although rotational torque can be converted into thrust, thrust cannot be converted into rotational torque. Hence, loosening of the third screw member stemming from counteracting thrust imposed by a load can be prevented. After given thrust has been imparted to a load, thrust of the reciprocation movement means can be interrupted, thereby realizing energy saving. Since the reciprocation movement means and the reciprocation-rotation conversion means are separated from each other in the rotating direction. There can be provided a thrust converter, wherein, when a second bearing is interposed between the reciprocation movement means and the reciprocation-rotation conversion means, no thrust load is imposed on the second bearing, thus lengthening the life of a shaft bearing.

Preferably, a main spindle shaft of a chucking apparatus corresponding to the substrate is secured to amount frame fixed to a load-side bracket of a motor by way of a third bearing so as to be rotatable and to not be capable of axial movement. There can be provided a thrust converter which can be replaced with a chucking apparatus employing related-art hydraulic or pneumatic cylinder.

Preferably, the second bearing is constituted of a double bearing. Hence, there can be provided a thrust converter which can reduce load exerted in the direction of thrust one-half, thereby lengthening the life of a shaft bearing.

Preferably, a motor whose torque can be controlled through current control is used as the motor, and constant thrust is produced by constant control of the current to the motor. There can be produced a thrust converter which can produce given thrust at all times.

Preferably, a motor whose torque and positions can be controlled through current control is used as the motor; and wherein the position of the motor is controlled until the motor moves to a predetermined position, and torque of the motor is controlled. When the thrust converter is applied to a lathe chucking apparatus, there can be provided a thrust converter capable of increasing chucking operation.

Preferably, on the basis of the moving state of an external driver source other than the drive source of the thrust converter, there is computed the amount of correction to be used for correcting the position or torque of a motor of the thrust converter. The position or torque of the motor of the thrust converter on the basis of the thus-computed amount of correction. Hence, application of mechanical disturbance to the thrust converter can be obviated. Hence, there can be provided a highly-precise thrust converter. For instance, when a chucking apparatus employs the thrust converter, disturbance due to centrifugal force can be eliminated, thereby enabling generation of appropriate holding force at all times.

Preferably, on the basis of the temperature of a machine having the thrust converter provided thereon, the amount of correction to be used for correcting the position of a motor of the thrust converter is computed or read from memory. The position of the motor of the thrust converter is corrected on the basis of the amount of correction. Application of thermal disturbance to the thrust converter can be obviated without addition of a special device. Hence, there can be provided a high-precision thrust converter. For instance, if a chucking apparatus adopts the thrust converter, thermal disturbance can be eliminated, thereby enabling constant generation of appropriate holding force.

Preferably, there are provided an input section for entering a moving status of an external drive source other than a drive source of the thrust converter; computation means for computing the amount of correction used for correcting the position or torque of a motor of the thrust converter on the basis of the moving status entered by way of the input section; and correction means for correcting the position or torque of the motor of the thrust converter on the basis of the computed amount of correction. Application of thermal disturbance to the thrust converter can be obviated without addition of a special device. Hence, there can be provided a high-precision thrust converter. For instance, if a chucking apparatus adopts the thrust converter, thermal disturbance can be eliminated, thereby enabling constant generation of appropriate holding force.

Preferably, there are provided an input section for entering the temperature of a machine having provided thereon the thrust converter;
    means for computing the amount of correction required for correcting the position of a motor of the thrust converter or reading the amount of correction from memory; and
    correction means for correcting the position of the motor of the thrust converter in accordance with the amount of correction. Application of thermal disturbance to the thrust converter can be obviated without addition of a special device. Hence, there can be provided a high-precision thrust converter. For instance, if a chucking apparatus adopts the thrust converter, thermal disturbance can be eliminated, thereby enabling, constant generation of appropriate holding force.

Preferably, there are provided a manual instruction device for inputting a positional instruction to a motor whose torque and position can be controlled;
    control means for controlling the position and torque of the motor; and
    changeover means for which operates the motor through position control on the basis of a difference when a difference between the positional instruction and the current position is lower than a predetermined value and changes the motor to torque control when the difference between the positional instruction and the current position exceeds the predetermined value. After the thrust converter has been constrained mechanically, thrust adjustment can be effected readily manually. When the thrust converter is applied to a lathe chucking apparatus, the status of the chucking apparatus shifts from position control to torque control by means of an operator entering only a position instruction. The operator can be effect an appropriate chuck opening/closing operation without consideration of statuses of the chuck opening and closing states.

Preferably, the changeover means comprises:
    current limit means for limiting a current instruction to be sent to the motor; and
    means which sets a limit current value of the current limit means so as to become greater than a current instruction value based on a difference when a difference between the positional instruction and the current position is lower than a predetermined value and which sets the limit current value of the current limit means so as to become smaller than the current instruction value based on a difference when a difference between the positional instruction and the current position exceeds the predetermined value. After the thrust converter has been constrained mechanically, thrust adjustment can be effected readily manually. Adjustment of thrust can be effected without changing the gain of a feedback loop, thereby preventing occurrence of unstable control operation. When the thrust converter is applied to a lathe chucking apparatus, the status of the chucking apparatus shifts from position control to torque control by means of an operator entering only a position instruction. The operator can be effect an appropriate chuck opening/closing operation without consideration of statuses of the chuck opening and closing states.

Preferably, there are provided an input section for entering a correction value to be used for correcting a mechanical positional error of the thrust converter;

storage means for storing the correction value entered by way of the input means; and correction means for correcting the mechanical positional error of the thrust converter on the basis of the correction value stored in the storage means. As a result, the positional accuracy of the thrust converter can be improved without being affected by the accuracy of a rotary sensor mounted on a motor or by the accuracy of the mechanism of the thrust converter. Hence, there can be provided a high-precision thrust converter through use of low-cost components and while saving costs.

INDUSTRIAL APPLICABILITY

A thrust converter according to the present invention can be applied to a method and controller for controlling the thrust converter, a press-working machine, and a lathe chucking apparatus. Further, the thrust converter can also be applied to equipment requiring a decelerator.

What is claimed is:

1. A thrust converter comprising:

reciprocating movement section;

reciprocation-rotation conversion section for converting reciprocating movement of the reciprocation movement section into rotational movement;

rotation-reciprocation conversion section for converting rotational movement of the reciprocation-rotation conversion section into reciprocating movement; and reaction-force receiving section for supporting reaction force of reciprocating movement of the rotation-reciprocation conversion section, wherein the reciprocation movement section, the reciprocation-rotation conversion section, the rotation-reciprocation conversion section, and the reaction-force receiving section are aligned in one line; and a through hole is formed to pass through the center axes thereof.

2. The thrust converter according to claim 1, wherein the reciprocation movement section comprises a motor, a fourth screw member provided on a load-side extremity of a shaft of the motor, a fifth screw member to be screw-engaged with the fourth screw member, a third detent section for locking the fifth screw member to restrict movement to only an axial direction, and motor rotation-reciprocation conversion section for converting the rotating movement of the shaft of the motor into reciprocating movement;

the reciprocation-rotation conversion section comprises a first screw member supported by the fifth screw member to allow rotation and to prohibit axial movement by way of a second shaft bearing, a second screw member to be screw-engaged with the first screw member, and a first detent section for locking the first screw member to restrict movement to only the axial direction;

the rotation-reciprocation conversion section comprises a screw section provided on the second screw member in a position different from the location of a screw section to be screw-engaged with the first screw member, a third screw member to be screw-engaged with the screw section, and a second detent section for locking the third screw member to restrict movement to only an axial direction; and the reaction-force receiving section comprises a substrate, the second screw member, and a first shaft bearing for supporting the second screw member on the substrate to allow rotation and to prohibit axial movement.

3. The thrust converter according to claim 2, wherein a main spindle shaft of a chucking apparatus corresponding to the substrate is secured to a mount frame fixed to a load-side bracket of a motor by way of a third bearing to be rotatable and not to be capable of axial movement.

4. A controller for controlling the thrust converter defined in claim 2, comprising:

an input section for entering a moving status of an external drive source other than a drive source of the thrust converter;

computation section for computing the amount of correction used for correcting the position or torque of a motor of the thrust converter on the basis of the moving status entered by way of the input section; and correction section for correcting the position or torque of the motor of the thrust converter on the basis of the computed amount of correction.

5. A controller for controlling the thrust converter as defined in claim 2, comprising:

an input section for entering the temperature of a machine having provided thereon the thrust converter;

section for computing the amount of correction required for correcting the position of a motor of the thrust converter or reading the amount of correction from memory; and correction section for correcting the position of the motor of the thrust converter in accordance with the amount of correction.

6. A controller for controlling the thrust converter as defined in claim 2, comprising:

a manual instruction device for inputting a positional instruction to a motor whose torque and position can be controlled;

control section for controlling the position and torque of the motor; and changeover section for which operates the motor through position control on the basis of a difference when a difference between the positional instruction and the current position is lower than a predetermined value and changes the motor to torque control when the difference between the positional instruction and the current position exceeds the predetermined value.

7. A controller for controlling the thrust converter as defined in claim 6, wherein the changeover section comprises:

current limit section for limiting a current instruction to be sent to the motor; and section which sets a limit current value of the current limit section so as to become greater than a current instruction value based on a difference when a difference between the positional instruction and the current position is lower than a predetermined value and which sets the limit current value of the current limit section so as to become smaller than the current instruction value based on a difference when a difference between the positional instruction and the current position exceeds the predetermined value.

8. A controller for controlling the thrust converter as defined in claim 2, comprising:

an input section for entering a correction value to be used for correcting a mechanical positional error of the thrust converter;

storage section for storing the correction value entered by way of the input section; and correction section for correcting the mechanical positional error of the thrust converter on the basis of the correction value stored in the storage section.

9. A thrust converter comprising:

reciprocating movement section;

reciprocation-rotation conversion section for converting reciprocating movement of the reciprocation movement section into rotational movement;

rotation-reciprocation conversion section for converting rotational movement of the reciprocation-rotation conversion section into reciprocating movement; and reaction-force receiving section for supporting reaction force of reciprocating movement of the rotation-reciprocation conversion section, wherein the reciprocation-rotation converter section comprises a first screw member to which axial thrust is imputed by the reciprocation movement section, a second screw member to be screw-engaged with the first screw member, and a first detent section for locking the first screw member to restrict movement to only an axial direction;

the rotation-reciprocation conversion section comprises a screw section provided on the second screw member in a position different from the location of a screw section to be screw-engaged with the first screw member, a third screw member to be screw-engaged with the screw section, and a second detent section for locking the third screw member to restrict movement to only an axial direction; and the reaction-force receiving section comprises a substrate, the second screw member, and a first shaft bearing for supporting the second screw member on the substrate to allow rotation and to prohibit axial movement.

10. The thrust converter according to claim 9, wherein the first screw member is supported by the reciprocation movement section by way of a second shaft bearing to be rotatable.

11. The thrust converter according to claim 9, wherein the second detent section for locking the third screw member to restrict movement to only an axial direction is interposed between the third screw member and a first screw member.

12. The thrust converter according to claim 9, wherein screw lead of the first screw member and screw lead of a second screw member to be screw-engaged with the first screw member are greater than screw lead of a screw section provided on the second screw member in a position different from the location of a screw section to be screw-engaged with the first screw member and greater than screw lead of a third screw member to be screw-engaged with the screw section.

13. The thrust converter according to claim 9, wherein screw lead of the first screw member and screw lead of a second screw member to be screw-engaged with the first screw member are smaller than screw lead of a screw section provided on the second screw member in a position different from the location of a screw section to be screw-engaged with the first screw member and smaller than screw lead of a third screw member to be screw-engaged with the screw section.

14. The thrust converter according to claim 9, wherein a screw lead angle between a screw section which is formed on the second screw member in a location different from that of a screw section to be screw-engaged with the first screw member and a third screw member to be screw-engaged with the screw section is taken as $\beta$ and a coefficient of friction of a screw is taken as $\mu$, a screw is formed to meet a relationship $\tan \beta < \mu$.

15. The thrust converter according to claim 10, wherein the second bearing is constituted of a double bearing.

16. A method of controlling a thrust converter comprising a reciprocation movement section which comprises a motor, and a motor rotation-reciprocation conversion section for converting rotating movement of a shaft of the motor into reciprocating movement, wherein a motor whose torque can be controlled through current control is used as the motor, and constant thrust is produced by constant control of the current to the motor, the method comprising:

converting reciprocating movement of a reciprocation movement section into rotational movement;

converting rotational movement of a reciprocation-rotation conversion section into reciprocating movement; and supporting reaction force of reciprocating movement of the rotation-reciprocation conversion section.

* * * * *